US011860935B2

(12) United States Patent
Al Majid et al.

(10) Patent No.: US 11,860,935 B2
(45) Date of Patent: Jan. 2, 2024

(54) PRESENTING CONTENT ITEMS BASED ON PREVIOUS REACTIONS

(71) Applicant: Snap Inc., Santa Monica, CA (US)

(72) Inventors: Newar Husam Al Majid, New York, NY (US); Nathan Kenneth Boyd, Los Angeles, CA (US); Laurent Desserrey, Los Angeles, CA (US); Matthew Thompson, Venice, CA (US); Jeremy Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/651,348

(22) Filed: Feb. 16, 2022

(65) Prior Publication Data

US 2022/0171806 A1 Jun. 2, 2022

Related U.S. Application Data

(63) Continuation of application No. 16/586,596, filed on Sep. 27, 2019, now Pat. No. 11,288,310.

(51) Int. Cl.
*G06F 3/0482* (2013.01)
*H04N 21/482* (2011.01)
(Continued)

(52) U.S. Cl.
CPC ............ *G06F 16/738* (2019.01); *G06F 3/016* (2013.01); *G06F 3/0482* (2013.01);
(Continued)

(58) Field of Classification Search
CPC .. G06F 16/738; G06F 9/451; G06F 16/24578; G06F 16/735; G06F 3/0482; G06F 3/0485
See application file for complete search history.

(56) References Cited

U.S. PATENT DOCUMENTS 8,396,760 B1  3/2013  Bradley et al.
8,624,908 B1  1/2014  Knee et al.
(Continued)

FOREIGN PATENT DOCUMENTS

CN      114450680 A     5/2022
WO  WO-2016138252 A1   9/2016
(Continued)

OTHER PUBLICATIONS

U.S. Appl. No. 16/586,473, filed Sep. 27, 2019, Content Item Module Arrangements.
(Continued)

*Primary Examiner* — Beau D Spratt
(74) *Attorney, Agent, or Firm* — Schwegman Lundberg & Woessner, P.A.

(57) ABSTRACT

Systems and methods are provided for performing operations including: retrieving, by one or more processors, a plurality of content items; identifying a first content item from the plurality of content items to which a user has previously reacted; determining a category of the first content item; selecting a second content item in the plurality of content items that is associated with the determined category of the first content item to which the user has previously reacted; and presenting the second content item to the user in a presentation arrangement of a graphical user interface.

20 Claims, 16 Drawing Sheets

(51) Int. Cl.
    *G06F 16/738*      (2019.01)
    *G06F 16/2457*     (2019.01)
    *G06F 16/735*      (2019.01)
    *G06F 3/01*        (2006.01)
    *G06F 3/0485*      (2022.01)
    *G06F 9/451*       (2018.01)

(52) U.S. Cl.
    CPC ............ *G06F 3/0485* (2013.01); *G06F 9/451* (2018.02); *G06F 16/24578* (2019.01); *G06F 16/735* (2019.01); *H04N 21/482* (2013.01)

(56) References Cited

U.S. PATENT DOCUMENTS

| | | | |
|---|---|---|---|
| 9,021,517 | B2 | 4/2015 | Selim |
| 9,361,640 | B1* | 6/2016 | Donsbach .......... G06Q 30/0633 |
| 9,509,643 | B1 | 11/2016 | Gade et al. |
| 9,532,111 | B1 | 12/2016 | Christie et al. |
| 9,953,358 | B1 | 4/2018 | Robertson |
| 10,021,051 | B2 | 7/2018 | Miklos et al. |
| 10,102,593 | B2 | 10/2018 | Benfield et al. |
| 10,135,949 | B1 | 11/2018 | Pavlovskaia et al. |
| 10,250,547 | B1 | 4/2019 | Jain et al. |
| 10,298,874 | B1 | 5/2019 | Lewis et al. |
| 10,310,699 | B1 | 6/2019 | Jain et al. |
| 10,536,542 | B1 | 1/2020 | Dorner et al. |
| 10,664,222 | B2 | 5/2020 | Miller et al. |
| 10,754,512 | B1* | 8/2020 | Greene ................. G06F 3/0484 |
| 10,841,257 | B1 | 11/2020 | Bragdon |
| 11,288,310 | B2 | 3/2022 | Al Majid et al. |
| 11,343,209 | B2 | 5/2022 | Al Majid et al. |
| 11,425,062 | B2 | 8/2022 | Al Majid et al. |
| 11,477,143 | B2 | 10/2022 | Al Majid et al. |
| 2006/0112076 | A1 | 5/2006 | Burris et al. |
| 2007/0157249 | A1 | 7/2007 | Cordray et al. |
| 2009/0125511 | A1 | 5/2009 | Kumar |
| 2009/0316671 | A1 | 12/2009 | Rolf et al. |
| 2010/0060649 | A1 | 3/2010 | Haggar et al. |
| 2010/0083312 | A1* | 4/2010 | White .................. H04N 21/485 725/39 |
| 2010/0251304 | A1* | 9/2010 | Donoghue ....... H04N 21/47202 725/46 |
| 2010/0306654 | A1 | 12/2010 | Lemieux et al. |
| 2011/0078718 | A1 | 3/2011 | Jakobi et al. |
| 2011/0145757 | A1 | 6/2011 | Janwari |
| 2011/0246383 | A1 | 10/2011 | Gibson et al. |
| 2011/0276396 | A1 | 11/2011 | Rathod |
| 2011/0288912 | A1 | 11/2011 | Mccrea et al. |
| 2012/0093476 | A1* | 4/2012 | Mountain ........ H04N 21/44008 386/E5.028 |
| 2012/0102021 | A1 | 4/2012 | Hill et al. |
| 2012/0139932 | A1 | 6/2012 | Sakamoto |
| 2012/0191715 | A1 | 7/2012 | Ruffner et al. |
| 2012/0215846 | A1 | 8/2012 | Howes et al. |
| 2012/0290978 | A1 | 11/2012 | Devecka |
| 2013/0086159 | A1 | 4/2013 | Gharachorloo et al. |
| 2013/0144883 | A1 | 6/2013 | Shin et al. |
| 2013/0262564 | A1 | 10/2013 | Wall et al. |
| 2013/0283301 | A1 | 10/2013 | Avedissian et al. |
| 2013/0312041 | A1* | 11/2013 | Gresta ................ H04N 7/17318 725/116 |
| 2013/0332523 | A1 | 12/2013 | Luu |
| 2014/0089806 | A1 | 3/2014 | Weast et al. |
| 2014/0156792 | A1* | 6/2014 | Roberts ................ H04N 21/472 709/217 |
| 2014/0157149 | A1 | 6/2014 | Nishizawa et al. |
| 2014/0196090 | A1 | 7/2014 | Kataoka et al. |
| 2014/0280626 | A1 | 9/2014 | Girish et al. |
| 2014/0282114 | A1 | 9/2014 | Walkin et al. |
| 2014/0297739 | A1 | 10/2014 | Stein et al. |
| 2014/0337791 | A1 | 11/2014 | Agnetta et al. |
| 2015/0058751 | A1 | 2/2015 | Tseng |
| 2015/0058758 | A1 | 2/2015 | Tseng |
| 2015/0066583 | A1 | 3/2015 | Liu et al. |
| 2015/0095329 | A1 | 4/2015 | Sanio et al. |
| 2015/0095775 | A1 | 4/2015 | Lewis et al. |
| 2015/0113407 | A1 | 4/2015 | Hoffert et al. |
| 2015/0127748 | A1 | 5/2015 | Buryak |
| 2015/0135337 | A1 | 5/2015 | Fushman et al. |
| 2015/0245097 | A1 | 8/2015 | Agrawal |
| 2015/0370830 | A1 | 12/2015 | Murphy-Chutorian et al. |
| 2016/0006721 | A1 | 1/2016 | Patel |
| 2016/0034712 | A1 | 2/2016 | Patton et al. |
| 2016/0042249 | A1 | 2/2016 | Babenko et al. |
| 2016/0085397 | A1 | 3/2016 | Jain |
| 2016/0094888 | A1 | 3/2016 | Peterson et al. |
| 2016/0134924 | A1 | 5/2016 | Bush et al. |
| 2016/0188728 | A1 | 6/2016 | Gill et al. |
| 2016/0227291 | A1 | 8/2016 | Shaw et al. |
| 2016/0259497 | A1 | 9/2016 | Foss et al. |
| 2016/0259528 | A1* | 9/2016 | Foss ..................... G06F 3/0483 |
| 2016/0357366 | A1 | 12/2016 | Migos et al. |
| 2016/0359993 | A1 | 12/2016 | Hendrickson et al. |
| 2017/0019474 | A1 | 1/2017 | Tevosyan et al. |
| 2017/0063774 | A1 | 3/2017 | Chen et al. |
| 2017/0070779 | A1 | 3/2017 | Kim et al. |
| 2017/0188101 | A1 | 6/2017 | Srinivasaraghavan |
| 2017/0212664 | A1 | 7/2017 | Ghadiyali et al. |
| 2017/0212771 | A1 | 7/2017 | Weissberg et al. |
| 2017/0250931 | A1 | 8/2017 | Loannou et al. |
| 2017/0255971 | A1 | 9/2017 | Box et al. |
| 2017/0289090 | A1 | 10/2017 | Yao et al. |
| 2017/0300571 | A1 | 10/2017 | Chiarandini et al. |
| 2018/0082313 | A1 | 3/2018 | Duggin et al. |
| 2018/0103005 | A1 | 4/2018 | Yadav et al. |
| 2018/0152763 | A1 | 5/2018 | Barlaskar et al. |
| 2018/0167472 | A1 | 6/2018 | Liu |
| 2018/0189030 | A1 | 7/2018 | Thaker et al. |
| 2018/0292955 | A1 | 10/2018 | Fakhouri |
| 2018/0292960 | A1 | 10/2018 | Orchard |
| 2018/0302358 | A1 | 10/2018 | Nambiar et al. |
| 2018/0332353 | A1 | 11/2018 | Ellis et al. |
| 2018/0367483 | A1 | 12/2018 | Rodriguez et al. |
| 2018/0374477 | A1 | 12/2018 | Kim et al. |
| 2019/0057143 | A1 | 2/2019 | Porter |
| 2019/0102396 | A1 | 4/2019 | Pan et al. |
| 2019/0141398 | A1 | 5/2019 | Auxer et al. |
| 2019/0258373 | A1 | 8/2019 | Davydov et al. |
| 2019/0281366 | A1* | 9/2019 | Henderson ......... H04N 21/8405 |
| 2019/0342618 | A1 | 11/2019 | Dudko |
| 2020/0012958 | A1 | 1/2020 | Natanson et al. |
| 2020/0019644 | A1 | 1/2020 | Mazouchi et al. |
| 2020/0159962 | A1 | 5/2020 | Patel |
| 2020/0213326 | A1 | 7/2020 | Herman |
| 2020/0241895 | A1 | 7/2020 | Voss |
| 2020/0301575 | A1 | 9/2020 | Lindholm et al. |
| 2020/0304863 | A1 | 9/2020 | Domm et al. |
| 2020/0356590 | A1* | 11/2020 | Clarke .................... G06F 9/451 |
| 2021/0097105 | A1 | 4/2021 | Al Majid et al. |
| 2021/0099405 | A1 | 4/2021 | Al Majid et al. |
| 2021/0099406 | A1 | 4/2021 | Al Majid et al. |
| 2021/0099407 | A1 | 4/2021 | Al Majid et al. |
| 2021/0099408 | A1 | 4/2021 | Al Majid et al. |
| 2022/0027333 | A1 | 1/2022 | Isaac |
| 2022/0210100 | A1 | 6/2022 | Al Majid et al. |

FOREIGN PATENT DOCUMENTS

WO    WO-2021062438 A1    4/2021
WO    WO-2021062438 A8    4/2021

OTHER PUBLICATIONS

U.S. Appl. No. 16/586,577, filed Sep. 27, 2019, Presenting Reactions From Friends.
U.S. Appl. No. 16/586,613, filed Sep. 27, 2019, Recommending Content Viewed by Friends (As Amended).
U.S. Appl. No. 16/586,596, filed Sep. 27, 2019, Presenting Content Items Based on Previous Reactions.
U.S. Appl. No. 16/586,569, filed Sep. 27, 2019, Tredning Content View Count.

(56) References Cited

OTHER PUBLICATIONS

"U.S. Appl. No. 16/586,473, Non Final Office Action dated Jul. 26, 2021", 23 pgs.
"U.S. Appl. No. 16/586,473, Response filed Oct. 25, 2021 to Non Final Office Action dated Jul. 26, 2021", 12 pgs.
"U.S. Appl. No. 16/586,569, Non Final Office Action dated Oct. 27, 2021", 41 pgs.
"U.S. Appl. No. 16/586,577, Non Final Office Action dated Feb. 2, 2021", 25 pgs.
"U.S. Appl. No. 16/586,577, Notice of Allowance dated May 28, 2021", 17 pgs.
"U.S. Appl. No. 16/586,577, Notice of Allowance dated Sep. 9, 2021", 17 pgs.
"U.S. Appl. No. 16/586,577, Response filed Apr. 21, 2021 to Non Final Office Action dated Feb. 2, 2021", 12 pgs.
"U.S. Appl. No. 16/586,596, Advisory Action dated Jul. 12, 2021", 2 pgs.
"U.S. Appl. No. 16/586,596, Corrected Notice of Allowability dated Dec. 3, 2021", 2 pgs.
"U.S. Appl. No. 16/586,596, Final Office Action dated Apr. 22, 2021", 20 pgs.
"U.S. Appl. No. 16/586,596, Non Final Office Action dated Jul. 30, 2021", 24 pgs.
"U.S. Appl. No. 16/586,596, Non Final Office Action dated Oct. 1, 2020", 15 pgs.
"U.S. Appl. No. 16/586,596, Notice of Allowance dated Nov. 18, 2021", 9 pgs.
"U.S. Appl. No. 16/586,596, Response filed Jun. 17, 2021 to Final Office Action dated Apr. 22, 2021", 11 pgs.
"U.S. Appl. No. 16/586,596, Response filed Oct. 28, 2021 to Non Final Office Action dated Jul. 30, 2021", 13 pgs.
"U.S. Appl. No. 16/586,596, Response filed Dec. 29, 2020 to Non Final Office Action dated Oct. 1, 2020", 12 pgs.
"U.S. Appl. No. 16/586,613, Non Final Office Action dated Nov. 5, 2021", 22 pgs.
"International Application Serial No. PCT/US2020/070570, International Search Report dated Nov. 11, 2020", 4 pgs.
"International Application Serial No. PCT/US2020/070570, Written Opinion dated Nov. 11, 2020", 6 pgs.
Liu, Y, et al., "Characterizing and forecasting user engagement with in-app action graph: A case study of snapchat", Proceedings of the 25th ACM SIGKDD International Conference on Knowledge Discovery & Data Mining, Anchorage, AK, USA, (Aug. 4-8, 2019), 2023-2031.
"U.S. Appl. No. 16/586,473, Advisory Action dated Mar. 31, 2022", 4 pgs.
"U.S. Appl. No. 16/586,473, Final Office Action dated Feb. 7, 2022", 30 pgs.
"U.S. Appl. No. 16/586,473, Response filed Mar. 11, 2022 to Final Office Action dated Feb. 7, 2022", 12 pgs.
"U.S. Appl. No. 16/586,569, Final Office Action dated Mar. 16, 2022", 53 pgs.
"U.S. Appl. No. 16/586,569, Notice of Allowance dated Jun. 7, 2022", 14 pgs.
"U.S. Appl. No. 16/586,569, Response filed Jan. 19, 2022 to Non Final Office Action dated Oct. 27, 2021", 10 pgs.
"U.S. Appl. No. 16/586,569, Response filed May 16, 2022 to Final Office Action dated Mar. 16, 2022", 11 pgs.
"U.S. Appl. No. 16/586,577, Corrected Notice of Allowability dated Jan. 26, 2022", 2 pgs.
"U.S. Appl. No. 16/586,577, Corrected Notice of Allowability dated Apr. 29, 2022", 2 pgs.
"U.S. Appl. No. 16/586,577, Notice of Allowance dated Dec. 22, 2021", 16 pgs.
"U.S. Appl. No. 16/586,613, Notice of Allowability dated May 4, 2022", 2 pgs.
"U.S. Appl. No. 16/586,613, Notice of Allowance dated Apr. 13, 2022", 13 pgs.
"U.S. Appl. No. 16/586,613, Response filed Jan. 28, 2022 to Non Final Office Action dated Nov. 5, 2021", 12 pgs.
"International Application Serial No. PCT/US2020/070570, International Preliminary Report on Patentability dated Apr. 7, 2022", 8 pgs.
"U.S. Appl. No. 16/586,473, Non Final Office Action dated Sep. 23, 2022", 35 pgs.
"European Application Serial No. 20786685.6, Response to Communication Pursuant to Rules 161 and 162 EPC filed Oct. 20, 22", 10 pgs.
"U.S. Appl. No. 16/586,473, Response filed Dec. 13, 2022 to Non Final Office Action dated Sep. 23, 2022", 14 pgs.
"U.S. Appl. No. 16/586,473, Examiner Interview Summary dated Dec. 16, 2022", 2 pgs.
"European Application Serial No. 20786685.6, Communication Pursuant to Article 94(3) EPC dated Jan. 26, 2023", 5 pgs.
"U.S. Appl. No. 17/697,659, Notice of Allowance dated Feb. 21, 2023", 17 pgs.
"U.S. Appl. No. 16/586,473, Final Office Action dated Mar. 30, 2023", 35 pgs.
"U.S. Appl. No. 16/586,473, Response filed May 9, 2023 to Final Office Action dated Mar. 30, 2023", 15 pgs.
"U.S. Appl. No. 16/586,473, Examiner Interview Summary dated May 12, 2023", 2 pgs.

* cited by examiner

| Category ~220 | Ordering 221 | Presentation Arrangement Type 222 | Criteria to Appear 223 |
|---|---|---|---|
| Hero Tile | 1 | Hero | Always Show. |
| My Shows | 2 | Horizontal List | Always Show. Show Empty State if no Content in Section. |
| Reactions from Friends | 3 | Vertical List | 1+ Content in Section. |
| Trending Now | 4 | Vertical List | 1+ Content in Section. |
| Top Picks for You | 5 | Vertical List | Always Show. Include Exactly 3 Pieces of Content. |
| Continue Watching | 6 | Horizontal List | 2+ Content in Section. |
| Popular on Messaging Application | 7 | Vertical List | Always Show. Include at Least 6 Pieces of Content (3 Visible, 3 More when tap View More). |
| Popular Articles | Algorithmic | Vertical List | 3+ Content in Section. |
| New on Messaging Application | Algorithmic | Horizontal List | 3+ Content in Section. |
| Friends are Watching | Algorithmic | Vertical List | 2+ Content in Section. |
| Messaging Application Original Content | Algorithmic | Horizontal List | 3+ Content in Section. |
| Non-Serialized Show Deep-Dive | Algorithmic | Horizontal List | 3+ Content in Section. |
| Because you reacted | Algorithmic | Vertical List | 3+ Content in Section. |
| Read More About... | Algorithmic | Vertical List | 3+ Content in Section. |
| General Categories | Algorithmic | Vertical List | 3+ Content in Section. |
| Special Collections | Algorithmic | Horizontal List | 3+ Content in Section. |
| Watch it Again | Algorithmic | Horizontal List | 3+ Content in Section. |
| Select Interests | Algorithmic | n/a, Unique Module | Show Until User Selects Interests, then do not Show again. |
| Find More | End of Page | n/a, Unique Module | Always Show. |

FIG. 2B

PRESENTING CONTENT ITEMS BASED ON PREVIOUS REACTIONS

CLAIM OF PRIORITY

This application is a continuation of U.S. patent application Ser. No. 16/586,596, filed on Sep. 27, 2019, which is incorporated herein by reference in its entirety.

TECHNICAL FIELD

The present disclosure relates generally to content surfacing using a messaging application.

BACKGROUND

Modern day user devices provide applications that allow users to exchange messages with each other. Such applications have recently started incorporating the ability for users to consume various other content items, such as videos and images that are user generated as well as those content items generated by sponsors or content providers.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which:

FIGS. 2A and 2B are schematic diagrams illustrating data which may be stored in the database of a messaging server system, according to example embodiments.

DETAILED DESCRIPTION

Figure 1:
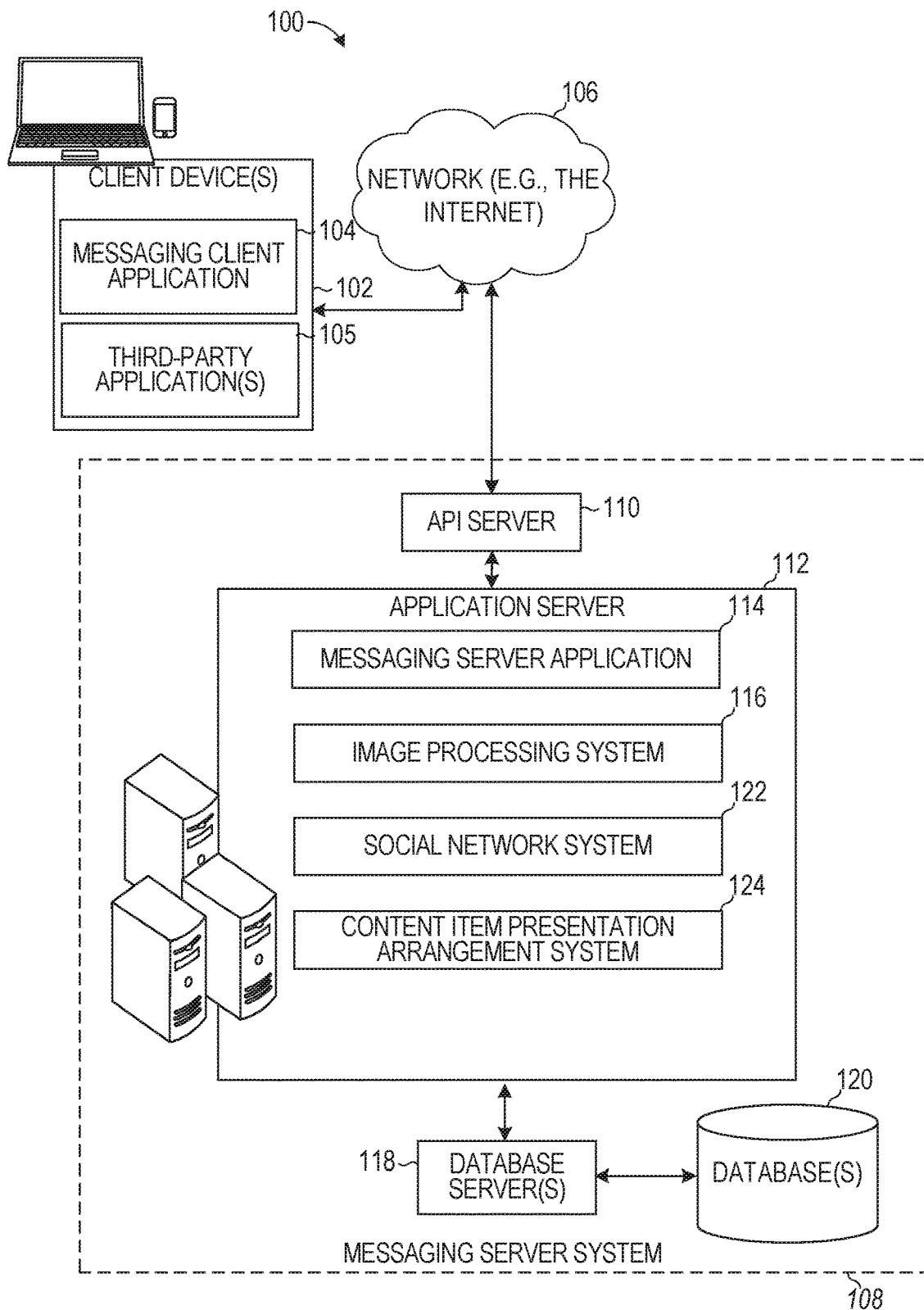
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typically, users exchange messages with each other using messaging applications. Such applications have recently started allowing users to also browse other types of content items, such as videos and images. However, the user interfaces currently available in such messaging applications limit the users' ability to find content to consume quickly and efficiently. Users end up spending a great deal of time finding the right content to consume through the currently available interfaces.

Specifically, the interfaces currently available in the messaging applications fail to organize and structure content items, such as videos and images, in a way that makes it easy for a user to find interesting content and to figure out what types of content are available to access. To find content to consume in the interfaces of current messaging applications, the user has to manually search for content using keywords or navigate through multiple pages of disorganized information. Given the complexity and amount of time it takes to find content to consume, users become frustrated and discouraged from accessing content items in the messaging applications, which results in a waste of resources or lack of use.

The disclosed embodiments improve the efficiency of using the electronic device by providing a system that intelligently surfaces content by selecting and presenting content items for a user to consume in a messaging application using various criteria and presentation arrangements. Specifically, according to the disclosed embodiments, a messaging application implemented by one or more processors of a user device presents a list of navigation options for accessing various content and functions of the messaging application. Such options include a map option, a chat option, a camera option, a community content option, and a content browsing option. When the user selects the content browsing option, the messaging application retrieves various content items available for the user to consume. The messaging application determines categories for the content items and selects between various presentation arrangements for presenting the content items according to their categories.

As an example, a first content item may be determined to be associated with a "reaction from friends" category. In such cases, the messaging application presents a tile representing the first content item in a presentation arrangement that includes a horizontal list of tiles in a dedicated "reaction from friends" category. As another example, a second content item may be determined to be associated with a "viewed by friends" category. In such cases, the messaging application presents a tile representing the second content item in a presentation arrangement that includes a vertical list of tiles in a dedicated "viewed by friends" category. As another example, a third content item may be determined to be associated with "because you reacted" category. In such cases, the messaging application presents a tile representing the third content item in a presentation arrangement that includes a single tile at a locked position at the top of the screen. The various presentation arrangements are presented in the same screen and are revealed as the user scrolls up/down the screen, such as by providing a gesture that swipes up/down the screen.

The messaging application organizes the content items presented in their respective presentation arrangements according to various criteria, such as whether the content items are trending, popular, have been viewed by a user's friends, age of the user, and so forth. The messaging application dynamically changes the positioning of the tiles in the respective presentation arrangements as the criteria changes over time. In some cases, the messaging application adjusts positioning of certain presentation arrangements that present content corresponding to various categories over time and maintains certain other presentation arrangements that present content corresponding to various other categories in dedicated positions. This allows the messaging application to ensure content items that are of greatest interest to the user are presented before other content items that may be of lesser interest to the user. The messaging application also provides a view count indicator for each or certain tiles that informs the user about how many times the respective content has been viewed. The view count indicator may graphically depict different values for the views based on whether the corresponding content is determined to be trending or popular. The view count indicator that is displayed is dynamically updated to make the user feel more engaged with the content.

In some cases, the messaging application automatically presents previews of content corresponding to content items within the tiles of the content items as the user browses through content. Specifically, as the user scrolls down or up the list of content that is presented, the messaging application automatically starts and stops playback of video clips that include previews based on the current scroll position of the content item corresponding to the video clips. When a user selects a given content item to play back, the messaging application presents a player that includes a transport bar with indications of reactions of the user's friends to the content being presented. The reactions are presented when the user reaches play positions at which the friends provided the reactions to the content. The user can, within the player, respond to the friend's reaction and/or minimize the player to chat with their friends.

In this way, the disclosed embodiments improve the efficiency of using the electronic device by reducing the number of screens and interfaces a user has to navigate through to find content to consume. This is done by organizing and structuring content items available using the messaging application based on various criteria and using specific presentation arrangements. This reduces the device resources (e.g., processor cycles, memory, and power usage) needed to accomplish a task with the device.

While certain examples relate to the disclosed techniques being provided in connection with a messaging application, the disclosed techniques can be similarly used for surfacing content in any application/platform that provides access to consumable media content, being particularly useful for applications that provide both messaging and content access/consumption functionalities.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and a third-party application 105. Each messaging client application 104 is communicatively coupled to other instances of the messaging client application 104, the third-party application 105, and a messaging server system 108 via a network 106 (e.g., the Internet).

Accordingly, each messaging client application 104 and third-party application 105 is able to communicate and exchange data with another messaging client application 104 and third-party application(s) 105 and with the messaging server system 108 via the network 106. The data exchanged between messaging client applications 104, third-party applications 105, and between a messaging client application 104 and the messaging server system 108 includes functions (e.g., commands to invoke functions) and payload data (e.g., text, audio, video, or other multimedia data). Any disclosed communications between the messaging client application 104 and the third-party application(s) 105 can be transmitted directly from the messaging client application 104 to the third-party application(s) 105 and/or indirectly (e.g., via one or more servers) from the messaging client application 104 to the third-party application(s) 105.

The third-party application(s) 105 and the messaging client application 104 are applications that include a set of functions that allow the client device 102 to access a content item presentation arrangement system 124. The third-party application 105 is an application that is separate and distinct from the messaging client application 104. The third-party application(s) 105 are downloaded and installed by the client device 102 separately from the messaging client application 104. In some implementations, the third-party application(s) 105 are downloaded and installed by the client device 102 before or after the messaging client application 104 is downloaded and installed. The third-party application 105 is an application that is provided by an entity or organization that is different from the entity or organization that provides the messaging client application 104. The third-party application 105 is an application that can be accessed by a client device 102 using separate login credentials than the messaging client application 104. Namely, the third-party application 105 can maintain a first user account and the messaging client application 104 can maintain a second user account. In an embodiment, the third-party application 105 can be accessed by the client device 102 to perform various activities and interactions, such as listening to music, watching videos, tracking exercises, viewing graphical elements (e.g., stickers), communicating with other users, and so forth.

As an example, the third-party application 105 can be a social networking application, a dating application, a ride or car sharing application, a shopping application, a trading application, a gaming application, an imaging application, a music application, a video browsing application, an exercise tracking application, a health monitoring application, a graphical element or sticker browsing application, or any other suitable application.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, graphical elements, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the third-party application 105 in order to invoke functionality of the application server 112. The API server 110 exposes various functions supported by the application server 112, including account registration; login functionality; the sending of messages, via the application server 112, from a particular messaging client application 104 to another messaging client application 104 or third-party application 105; the sending of media files (e.g., graphical elements, images, or video) from a messaging client application 104 to the messaging server application 114, and for possible access by another messaging client application 104 or third-party application 105; a graphical element list; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the content item presentation arrangement system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or videos received within the payload of a message at the messaging server application 114. A portion of the image processing system 116 may also be implemented by the content item presentation arrangement system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The content item presentation arrangement system 124 allows a user to browse and view content using various presentation arrangements. In some embodiments, the content item presentation arrangement system 124 presents a user interface that includes a plurality of content navigation options. A first of the plurality of content navigation options includes a map option, a second of the plurality of content navigation options includes a chat option, a third of the plurality of content navigation options includes a camera option, a fourth of the plurality of content navigation options includes a community content option, and a fifth of the plurality of content navigation options includes a content browsing option. The content item presentation arrangement system 124 receives a user selection of the fifth option and in response presents a set of content items in one or more different presentation arrangements.

In some embodiments, the content item presentation arrangement system 124 determines a category of each content item to be presented in the user interface and selects the presentation arrangement in which to present the respective content item based on the category. In an embodiment, each category is associated with a set of rules that determine the type of content items to present in association with the category, ranking of content items presented in association with the category, when to present the content items in association with the category, and/or the number of content items to present in association with the category. A user interface may present content items associated with multiple categories simultaneously and may divide the screen based on the categories. Each category may be associated with a different presentation arrangement. The category may be a "my shows" category, a "reactions from friends" category, a "trending now" category, a "top picks" category, a "continue watching" category, a "popular on a messaging application" category, a "new on the messaging application" category, a "friends are watching" category, a "because you reacted" category, a "documentary" category, a "news" category, a "comedy" category, a "watch it again" category, or any other combination of categories or other suitable categories.

For example, the content item presentation arrangement system 124 may retrieve a set of content items to present to the user in a graphical user interface. The content item presentation arrangement system 124 determines that a first content item in the set of content items corresponds to a "reactions from friends" category. In response, the content item presentation arrangement system 124 selects a vertical presentation arrangement in which content tiles representing different content items are presented in a vertical list. The first content item is presented among the content tiles in the vertical presentation arrangement. The content item presentation arrangement system 124 determines a second content item in the set of content items corresponds to a "my shows" category. In response, the content item presentation arrangement system 124 selects a horizontal presentation arrangement in which content tiles representing different content items are presented in a horizontal list. The second content item is presented among the content tiles in the horizontal presentation arrangement concurrently or simultaneously with the first content item.

In some cases, the graphical tile representations may look and feel different between different presentation arrangements. For example, the horizontal presentation arrangement may include larger image size content tiles (e.g., tiles with larger aspect ratios) than the tiles presented in the vertical presentation arrangement. The hero tile presentation arrangement in which a single tile is presented in a merchandise manner may include less information than the horizontal and the vertical arrangements, and the size of the single tile (e.g., the aspect ratio of the single tile) may be larger than the sizes or aspect ratios of the content tiles of both the horizontal and vertical arrangements. Content items presented in the vertical list may be scrolled by the user by performing a first gesture, such as swiping up/down on the screen. Content items presented in the horizontal list may be scrolled by the user by performing a second gesture, such as swiping left/right while having the user's finger positioned over a region in which the tiles of the content items in the horizontal list are presented. If the user swipes left/right outside of the region in which the tiles of the content items in the horizontal list are presented, no action is performed unless other tiles of another presentation arrangement are presented in a horizontal list.

In some cases, the information included with each tile in the different presentation arrangements may differ in the level or amount of detail provided. For example, the horizontal tile presentation arrangement may include a view count for each content tile while the vertical tile presentation arrangement may exclude the view count for each content tile. As another example, the vertical tile presentation arrangement may include a title and brief description of the content associated with the content tiles while the horizontal tile presentation arrangement may include the title of the content but exclude the brief description of the content. As another example, the vertical tile presentation arrangement may include reaction from friends information associated with the content item tiles while the single hero tile presentation arrangement may exclude the reaction from friends information for the content item corresponding to the single hero tile.

In some embodiments, the level of detail for the same presentation arrangement may differ based on the category associated with the given presentation arrangement. For example, a horizontal presentation arrangement for a "continue watching" category may include, within each content tile or cell, a title or headline, a duration or amount of time remaining to be watched, an image of a frame of the content, a view count, and a transport bar. A horizontal presentation arrangement for a "messaging application originals" category may include, within each content tile or cell, a cover art or graphical representation of the content, a total number of episodes or segments for the content, and representations of friends who have reacted to the corresponding content. The horizontal presentation arrangement for a "messaging application originals" category excludes a content title or headline, an image of a frame of the content, and a view count that is included in the horizontal presentation arrangement for a "continue watching" category.

The content item presentation arrangement system 124 allows a user to navigate or scroll up and down (e.g., by performing a gesture, such as swiping up/down on the screen) the list of content items presented. As the user scrolls the list, new content items in different categories and presentation arrangements are revealed. In an embodiment, when a given content item in a given presentation arrangement comes into focus (e.g., enters the center of the screen) while the user navigates or scrolls the list, a preview clip of content associated with the given content item is automatically played. The preview clip is played and presented in place of the cover art presented in the content tile for the given content item. As the user continues scrolling, the preview clip of the given content item pauses or stops and a preview clip of content associated with a different content item begins playing in place of the cover art presented in the tile for the different content item. In this way, only one preview clip of content is presented to the user at a time. In an embodiment, when the preview clip begins play, the content item presentation arrangement system 124 generates haptic feedback (e.g., by vibrating the client device 102 on which the user interface is displayed for a short interval, such as vibrating for 1 millisecond). This alerts the user to the fact that the preview clip has begun playing.

In some embodiments, the content item presentation arrangement system 124 selects the preview clip to present in the content tiles from a plurality of preview clips associated with a given content item. For example, each content item may be associated with an episode preview clip and a series preview clip. The content item presentation arrangement system 124 selects either the episode or the series preview clip based on a viewing history of the user for whom the preview clip is presented. Specifically, the content item presentation arrangement system 124 determines that a first content item is part of a serial collection of content items (e.g., the first content item is an episode in a series of episodes). The content item presentation arrangement system 124 also retrieves a viewing history for the user to determine that the user has not viewed any content items in the serial collection of content items. In response, the content item presentation arrangement system 124 selects a preview clip representing the entire serial collection of content items (e.g., a preview clip promoting the series). Alternatively, the content item presentation arrangement system 124 may determine that the user has viewed a given content item in the serial collection of content items. In response to determining that the user has viewed the given content item, the content item presentation arrangement system 124 retrieves a preview clip of a next content item in the serial collection that sequentially follows the given content item. Specifically, if the content tile represents a series and the content item presentation arrangement system 124 determines that the user has seen episode number 5 in the series, the content item presentation arrangement system 124 retrieves the preview clip associated with episode number 6 in the series. The retrieved preview clip is presented in the content tile for the series.

In some embodiments, the content item presentation arrangement system 124 selects whether or not to present certain categories of content items in their respective presentation arrangements based on the number of available content items. For example, the content item presentation arrangement system 124 may determine that a first category (e.g., a "viewed by friends" category) is associated with two content items (e.g., because the user's friends only viewed the two content items within a specified interval, such as within the past 7 days). The content item presentation arrangement system 124 may determine that the presentation arrangement associated with the first category requires three or more content items to be associated with the first category. As a result, the content item presentation arrangement system 124 may exclude presenting the first category and content items associated with the first category in the user interface. In some implementations, the content item presentation arrangement system 124 may determine that rules associated with a given presentation arrangement specify that there is no limit or minimum for the number of available content items. As a result, the content item presentation arrangement system 124 may invariably present a second category in a corresponding presentation arrangement regardless of the number of content items associated with the second category.

In some embodiments, the content item presentation arrangement system 124 presents a first set of categories in their respective presentation arrangements in dedicated positions on the user interface. The content item presentation arrangement system 124 presents a second set of categories in their respective presentation arrangements in dynamically determined positions on the user interface based on a user profile. For example, a "my shows" category may be presented at the top of the user interface in a dedicated position and a "news" category may be presented last or at the bottom of the screen. A "reaction from friends" category may sometimes be presented directly under the first category (e.g., the "my shows" category) and other times may be excluded or be presented in the middle between multiple other categories. For example, if the user profile indicates that the user often selects content from the "reaction from friends" category, then the content item presentation arrangement system 124 presents the content items in the "reaction from friends" category directly under the first category (e.g., the "my shows" category). For example, if the user profile indicates that the user infrequently selects content from the "reaction from friends" category, then the content item presentation arrangement system 124 excludes the content items in the "reaction from friends" category or presents it at the bottom of the list above the last category.

In some embodiments, the content item presentation arrangement system 124 selects content to present in the "reaction from friends" category based on reaction data of the user's friends. For example, the content item presentation arrangement system 124 may access a list of friends of the user stored by the messaging client application 104 and may then obtain reaction data for each friend in the list of friends, with the reaction data identifying a set of content items to which respective ones of the friends in the list of friends reacted. The reaction data identifies a type of reaction including at least one of a comment received from a friend, a play position marked by the friend, or an emoji provided by the friend in association with a given content item or play position within the given content item. The presentation arrangement corresponding to the "reactions from friends" category is configured to exclusively present content items to which respective ones of the friends in the list of friends reacted. In some implementations, the content item presentation arrangement system 124 presents avatars to represent the friends that reacted to the content items that are presented in the presentation arrangement, such as within or next to the tiles corresponding to each content item.

The content items presented in the "reaction from friends" category may be dynamically ordered based on how often the user consumes content generated by one friend over another. For example, the "reaction from friends" category includes a first content item to which a first friend reacted and a second content item to which a second friend reacted. The content item presentation arrangement system 124 may access consumption data from the messaging client application 104 indicating how often the user accesses content generated by various friends. The content item presentation arrangement system 124 may determine that the user consumes content generated by the second friend more often or for longer duration than the first friend. In response, the content item presentation arrangement system 124 may position the second content item to which the second friend reacted ahead or above the first content item to which the first friend reacted. In another embodiment, the content items presented in the "reaction from friends" category may be similarly dynamically positioned based on how often the user communicates with various friends, a number of messages exchanged between the user and the friends, and/or importance of the messages exchanged and whether such messages include media content, such as videos or images in addition to text.

In some embodiments, the content item presentation arrangement system 124 receives a user selection of a tile associated with a given content item presented in the presentation arrangement. For example, a user may tap on the screen at a position corresponding to the tile presentation. In response, the content item presentation arrangement system 124 launches a video player for playing content associated with the content item corresponding to the selected tile. The video player may launch in full screen or in a partial portion of the screen. The video player includes a browse bar identifying the title of the content item being presented, a description, and the content source. The browse bar may be presented at the top of the screen and may also identify other content sources that are available. The browse bar can be navigated by the user to view a list of content items that will be presented next automatically after the current content item finishes being played back.

The video player includes a transport bar at the bottom of the display. The transport bar may show the user how much of the content has been buffered as the content is being downloaded. The transport bar also shows divisions of different segments of the show. The transport bar includes representations, such as avatars, of the user's friends who reacted to the content item being played back. The transport bar may fade away from being displayed after a specified period of time (e.g., 3 seconds). The transport bar is revealed automatically when the user pauses playback of the content.

The representations may be visually and graphically positioned along the transport bar based on the play position corresponding to the reaction received from the friend. For example, if a first friend made a comment about the content item at a given playback position 1:30 (min:sec), an avatar representing the first friend may be placed adjacent or proximate the given playback position 1:30 to alert the user about the reaction made by the first friend and when the reaction was made. The user can tap or select the representation to view the reaction before playback reaches the given playback position. In some embodiments, the content item presentation arrangement system 124 automatically presents the reaction made by the first friend when the playback of the content reaches the given play position. In an embodiment, the user can respond directly to the first friend by replying to the reaction with text, image, or video. A message is sent to the first friend with the response via a chat interface of the messaging client application 104.

In some embodiments, to react to content being presented, a user can perform a gesture, such as swiping up while the content is being played back. The user can input the reaction, such as text, image, or video, and the reaction is stored in association with the playback position of the content when the user performed the gesture. Playback may automatically be paused when the user performs the gesture to provide a reaction or the content may continue to be played back while the user inputs the reaction. After the reaction is input by the user and stored in association with the playback position, friends of the user can view the reaction when they access the same content item. Also, the content item to which the user reacted can be included and become visible in a "reaction from friends" category that is presented to the user's friends.

In some embodiments, the content item presentation arrangement system 124 selects content to present in the "friends are watching" category based on viewership data of the user's friends. For example, the content item presentation arrangement system 124 may access a list of friends of the user stored by the messaging client application 104 and may then obtain viewership data for each friend in the list of friends, with the viewership data identifying a set of content items viewed by respective ones of the friends. The presentation arrangement corresponding to the "friends are watching" category is configured to exclusively present content items that have been viewed by the friends in the list of friends. In some implementations, the content item presentation arrangement system 124 presents avatars to represent the friends that viewed the content items that are presented in the presentation arrangement, such as within or next to the tiles corresponding to each content item.

In some cases, the viewership data identifies which segments in a sequential list of segments of a content item the friends have viewed. For example, a given content item may include a plurality of sequential segments (each of a duration that is less than 5 seconds) that are played back in sequence automatically when the user selects the given content item. The content item presentation arrangement system 124 may track which segments of a particular content item each friend has viewed and may only include the content item in the "friends are watching" category if a given friend has viewed more than a threshold number (e.g., more than 3) segments of the content item. For example, a first content item may include five segments and a first friend may view the first two segments and may then exit or terminate playback of the first content item. This interaction information is stored in association with the first friend and the first content item. The content item presentation arrangement system 124 may receive a user request to access the "friends are watching" category (e.g., by the user scrolling through the list of categories). The content item presentation arrangement system 124 may exclude presenting the first content item in the "friends are watching" category because the presentation arrangement rules for this category require that more than three segments have been viewed of a given content item to include the given content item in the category. In this case, because the first friend only viewed two segments which is less than the three segment threshold, the content item presentation arrangement system 124 does not present a content item tile for the first content item in the "friends are watching" category.

As another example, a second content item may include seven segments and a second friend may view the first four segments and may then exit or terminate playback of the second content item. Namely, while a first segment of the seven segments is presented to the second friend, and before reaching the end of the first segment, the second friend may tap on the screen or perform another action to skip to the next adjacent segment. In response, the content item presentation arrangement system 124 may store an indication that the second friend has viewed the first segment of the seven segments. Namely, even though the second user skipped over a remaining portion of the first segment, the first segment is still marked as being viewed. In other cases, if the first segment is skipped, it is not marked as being viewed. Then, while the second segment is presented and after the second segment finishes being played back, the content item presentation arrangement system 124 presents the third segment. Also, the content item presentation arrangement system 124 stores an indication that the second friend has also viewed the second segment. During playback of the third segment, the second friend may request to skip to the next adjacent segment and, in response, an indication is stored that the second friend has viewed four segments. This interaction information is stored in association with the second friend and the second content item. The content item presentation arrangement system 124 may receive a user request to access the "friends are watching" category (e.g., by the user scrolling through the list of categories). The content item presentation arrangement system 124 may include presenting the second content item in the "friends are watching" category because the presentation arrangement rules for this category requires that more than three segments have been viewed of a given content item to include the given content item in the category.

In some embodiments, the content item presentation arrangement system 124 may condition presenting content items in the "friends are watching" category based on the relationship type between the user and the friend. Namely, even if a given friend has viewed a given content item, the content item presentation arrangement system 124 may exclude presenting the content item in the "friends are watching" category if the relationship between the user and the friend is not of a specified type (e.g., the relationship is unidirectional and is not bi-directional). A bi-directional relationship is one in which the user has sent a friend request to the friend and the friend accepted the friend request, and a unidirectional relationship is one in which the user is following content posted by the friend and has not established a bi-directional relationship by sending a friend request.

In some embodiments, the content item presentation arrangement system 124 may condition presenting content items in the "friends are watching" category based on the quantity or number of friends that have viewed the content items. For example, if a given content item has only been viewed by one friend which is less than a threshold (e.g., less than 3 friends), the content item presentation arrangement system 124 may exclude presenting the given content item in the "friends are watching" category. For example, if a given content item has been viewed by five friends, which is greater than a threshold (e.g., more than 3 friends), the content item presentation arrangement system 124 may include presenting the given content item in the "friends are watching" category. In some embodiments, after the user views a given content item presented in the "friends are watching" category, the content item presentation arrangement system 124 may remove and prevent presenting the content item in the "friends are watching" category when accessed at a later time.

In some embodiments, the content item presentation arrangement system 124 may dynamically re-order content tiles in the "friends are watching" category based on a user profile and/or viewership information of the user. For example, if the user selects to view a content item presented in the "friends are watching" category and then terminates playback before playback of the content item completes (e.g., the user partially views the content), the content item presentation arrangement system 124 may reduce a rank associated with the content item. Namely, the content item, when presented in the "friends are watching" category the next time the user views this category, may be positioned lower in the list than when it was presented before the user selected to view the content item.

In some embodiments, the content item presentation arrangement system 124 selects content to present in the "because you reacted" category based on reaction data of the user. For example, the content item presentation arrangement system 124 may access a list of content items to which the user previously reacted and identify a first content item in the list. The content item presentation arrangement system 124 determines a category of the first content item and selects a second content item in the plurality of content based on the determined category. For example, the first content item may be a comedy the user previously reacted to and the content item presentation arrangement system 124 selects a second content item that is also a comedy. The content item presentation arrangement system 124 presents the second content item in the "because you reacted" category. The presentation arrangement corresponding to the "because you reacted" category is configured to exclusively present content items that correspond to the same category of content the user previously reacted to.

In some cases, the second content item is one that the user has not previously viewed. In some other cases, the second content item is one the user has previously viewed and is presented with a recommendation to view the second content item again. In some implementations, after the user selects to view the content corresponding to the second content item and after viewing the content corresponding to the second content item to completion, the content item presentation arrangement system 124 prevents presenting the second content item in the "because you reacted" category when the user again causes this category to be displayed.

In some cases, the content items presented in the "because you reacted" category are ranked and ordered based on a user profile. The content item presentation arrangement system 124 may only present content items in the "because you reacted" category that have a rank that exceeds a specified threshold (e.g., the top 3 content items). The content items presented in the "because you reacted" category include content items previously viewed by the user, and such items are presented with an indication to view the content items again. Such content items are ranked based on a user profile and selectively included such that only those content items the user previously viewed that have a rank that exceeds a threshold are presented with the indication to view again. The user profile used to rank the content items may include a weighted list of interactions including an indication of content item engagement, whether the user captured a screenshot of the content item, whether the user shared the content item, whether the user commented about the content item, or whether the user indicated a level of like or dislike for the content item. Each such interaction may have a different weight associated that can be dynamically adjusted over time.

In some embodiments, the content item presentation arrangement system 124 maintains and presents a view count for each content item being presented. In some implementations, the content item presentation arrangement system 124 determines that the view count of a content item corresponds to trending content and presents a graphical indication of the view count representing the trending content. In some implementations, the content item presentation arrangement system 124 determines that the view count of a content item corresponds to popular content and presents a graphical indication of the view count representing the popular content. The indication of trending content is different from the indication of popular content. The content item presentation arrangement system 124 presents both content items with the different view counts (one for trending content and one for popular content) simultaneously.

The content item presentation arrangement system 124 updates the view counts in real time as the user browses content in the user interface. For example, while presenting a first content item with a first view count corresponding to trending content, the content item presentation arrangement system 124 receives a user request to scroll a display to reveal a second content item. The content item presentation arrangement system 124 determines that a second view count associated with the second content item corresponds to popular content. In response to determining that the second view count corresponds to popular content, when the display is scrolled to reveal the second content item, the content item presentation arrangement system 124 generates a first animation of a second indication to represent the second view count associated with the second content. The content item presentation arrangement system 124 determines that a third view count associated with a third content item that is revealed in the display together with the second content item corresponds to trending content. In response to determining that the third view count corresponds to trending content, when the display is scrolled to reveal the third content item (which may be revealed simultaneously with the second content item), the content item presentation arrangement system 124 generates a second animation of the third indication to represent the third view count associated with the third content. In some implementations, the animation used to represent the popular view count is different from the animation used to represent the trending view count. For example, the first animation graphically depicts the second indication as coming into view in the display once, and the second animation graphically depicts the third indication as coming into view in the display twice.

In some cases, the content item presentation arrangement system 124 generates the view count for a content item by accumulating a number of views of the content item within a specified time interview (e.g., the number of views within the past 7 days). The number of views is determined by determining that a given user has viewed a given number of segments of the sequential segments of a content item and that the given number exceeds a threshold. In some implementations, the content item presentation arrangement system 124 determines the number of views by determining that a given user has viewed a given number of a plurality of sequential segments of the first content item and that the given number of segments the given user has viewed exceeds a threshold. In some implementations, the content item presentation arrangement system 124 accumulates the number of views by receiving a request from a given user to view the first content item; presenting a first segment of sequential segments of the first content item to the given user; while presenting the first segment, receiving input from the given user to access an adjacent second segment; and incrementing the number of views in response to receiving the input from the given user.

For example, if a given user skips over a segment of the content item to view another segment, the content item presentation arrangement system 124 considers that the content item has been viewed. In some implementations, the content item presentation arrangement system 124 maintains separate view counts for individual episodes of a series and for viewing an entire season of a series to completion. In some cases, the content item presentation arrangement system 124 determines that the first view count corresponds to trending content by determining that the first view count is greater than view counts of a plurality of other content items published within a specified period of time, such as content items made available on the messaging client application 104 within the past seven days.

Specifically, the content item presentation arrangement system 124 computes a second view count for a first content item after a specified period of time from when the first content item has been made available for consumption on the messaging client application 104 to a plurality of users and retrieves an average view count threshold for all content items available for consumption within the specified period of time (e.g., within the past 7 days). The content item presentation arrangement system 124 determines that the first view count corresponds to trending content in response to determining that the second view count exceeds the average view count threshold. The average view count threshold is computed as a function of a percentage above a rolling average of content items made available within the specified period of time. The content item presentation arrangement system 124 determines that the first view count corresponds to trending content by determining that the first view count is less than a threshold percentage of all content items determined to be associated with a trending view count. The content item presentation arrangement system 124 maintains the first view count as being trending for a specified period of time after determining that the first view count corresponds to trending content and re-evaluates whether the first view count is trending after the specified period of time (e.g., after 7 days from when the content item was made available).

The application server 112 is communicatively coupled to a database server 118, which facilitates access to a database 120 in which is stored data associated with messages processed by the messaging server application 114. Database 120 may be a third-party database. For example, the application server 112 may be associated with a first entity, and the database 120 or a portion of the database 120 may be associated and hosted by a second different entity. In some implementations, database 120 stores user data that the first entity collects about various each of the users of a service provided by the first entity. For example, the user data includes user names, phone numbers, passwords, addresses, friends, activity information, preferences, videos or content consumed by the user, and so forth.

Figure 2A:
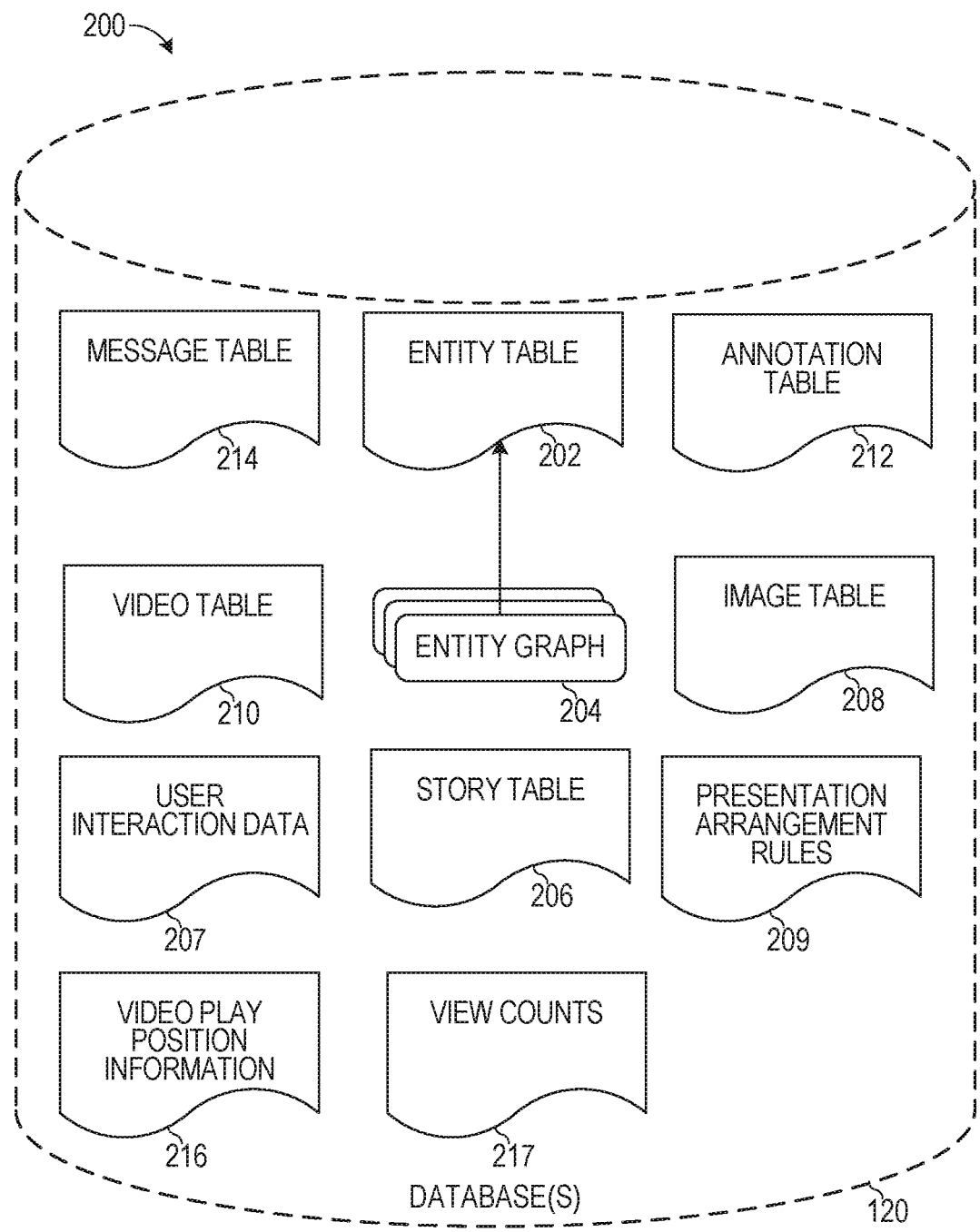

FIG. 2A is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier and an entity type identifier (not shown).

The entity graph 204 stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

User interaction data 207 stores various interaction information about users of the messaging client application 104. Such interaction information includes a viewing history representing content items a user has viewed. Such interaction information includes a reaction log representing content items that a user has reacted to (e.g., posted a comment about, shared with a friend, added to a favorites list, inserted an emoji for) as well as any play position information identifying the play position (e.g., a minute:second play position and/or a scene index) within the content item when the user reacted to the content item. The interaction information includes a list of which episodes and/or seasons of a series and/or which segments of a content item a user has viewed and/or tapped (skipped) over. For example, a user may access content that includes a sequential list of segments. The user can tap on the screen in the middle of a given segment to automatically access the next adjacent segment. In such cases, the interaction information includes an indication that the user tapped over, skipped over, and/or viewed the given segment.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

Presentation arrangement rules 209 stores a list of rules for which content a given presentation arrangement is configured to present, how many content items a given presentation arrangement is configured to present, how the content items (e.g., tiles representing the content items) are arranged in the given presentation arrangement, how often the content items are updated, and other suitable criteria for presenting content. An illustrative list of rules 209 is provided in FIG. 2B.

The list of rules 209 include, for each category of content, a title or name 220 of the category, a rank or position 221 in which the content items of the given category are presented in a list of categories to the user, a presentation arrangement type 222, and one or more criteria 223 in which content items appear in the given presentation arrangement. As an example, the content item presentation arrangement system 124 retrieves a content item and identifies a given one of the categories 220 associated with the retrieved content item. For example, the content item presentation arrangement system 124 determines that a given content item corresponds to the "reactions from friends" category 220. In response, the content item presentation arrangement system 124 retrieves the presentation arrangement type 222 associated with the "reactions from friends" category. In this case, the content item presentation arrangement system 124 determines that the presentation type is a list in which tiles representing each content item are vertically arranged. The content item presentation arrangement system 124 retrieves a tile having the corresponding aspect ratio or size for the vertical list arrangement for the given content item. The content item presentation arrangement system 124 determines whether additional content items can be presented in the "reaction from friends" category based on the criteria 223. In response to determining that additional content items can be presented, the content item presentation arrangement system 124 retrieves another content item that is associated with the same category to populate the "reactions from friends" category.

The vertical list arrangement is optimized for vertical scrolling. In an embodiment, by default, only three content item tiles are presented initially when the user navigates to a category that presents content items in the vertical list. At the bottom of the vertical list, is a "view more" option allows the user to retrieve and display additional content tiles corresponding to the same category. In response to the user selecting the "view more" option, three additional cells are displayed. The "view more" option is excluded from display if no additional cells for content items are available for the category. Each cell within this vertical list arrangement includes a content tile (that has a graphical image such as cover art representing the content item), a headline (e.g., a title), a show logo, a views count, a thumbnail that autoplays when the cell is in focus, a time indication of the duration of the content item, and a reactions preview identifying a user's friends that reacted to the content item. In an embodiment, the reactions of the user's friends are sorted or ranked based on the reaction that was received most recently such that the avatar or representation of the friend that most recently reacted to the content item is presented first in the list of reactions. In some embodiments, as a user scrolls through the content items in the browse interface, the opacity of each cell increases as the cell is brought into focus. The opacity of each cell goes back to default or decreases as the cell is scrolled out of focus.

As another example, the content item presentation arrangement system 124 retrieves a second content item and identifies a given one of the categories 220 associated with the retrieved second content item. The content item presentation arrangement system 124 determines that the second content item corresponds to the "watch it again" category 220. In response, the content item presentation arrangement system 124 retrieves the presentation arrangement type 222 associated with the "watch it again" category. In this case, the content item presentation arrangement system 124 determines that the presentation type is a list in which tiles representing each content item are horizontally arranged. The content item presentation arrangement system 124 retrieves a tile having the corresponding aspect ratio or size for the horizontal list arrangement for the second content item. The content item presentation arrangement system 124 determines whether additional content items can be presented in the "watch it again" category based on the criteria 223. In response to determining that additional content items can be presented, the content item presentation arrangement system 124 retrieves another content item that is associated with the same category to populate the "watch it again" category. In response to determining that no additional content items are associated with this category, the content item presentation arrangement system 124 determines whether the category requires a threshold minimum number of content items. In this case, the criteria 223 indicates that three or more content items are required to include a display of content in this category. Because the content item presentation arrangement system 124 only found one content item, which is less than the minimum threshold of three, the content item presentation arrangement system 124 excludes or prevents content items from being presented in the "watch it again" category when this category is presented to the user.

The horizontal list arrangement is optimized for horizontal scrolling. Each cell within this horizontal list arrangement includes a content tile (that has a graphical image such as cover art representing the content item), a headline (e.g., a title), a show logo, a views count, a thumbnail that autoplays when the cell is in focus, a time indication of the duration of the content item, and bitmoji (avatar) previews of reactions identifying a user's friends that reacted to the content item. In an embodiment, no more than three bitmojis of friends are presented. In an embodiment, the reactions of the user's friends are sorted or ranked based on the reaction that was received most recently such that the avatar or representation of the friend that most recently reacted to the content item is presented first in the list of reactions. In some embodiments, as a user scrolls through the content items in the browse interface, the opacity of each cell increases as the cell is brought into focus. The opacity of each cell goes back to default or decreases as the cell is scrolled out of focus.

The hero tile arrangement is optimized for drawing a user's attention to the content item. In an embodiment, by default, only one hero content item tile is presented when the user navigates to a category that presents content items in the hero tile arrangement. The cell within this hero tile arrangement includes a content tile (that has a graphical image such as cover art representing the content item), optionally a headline (e.g., a title), optionally a show logo, optionally a views count, optionally a thumbnail that autoplays when the cell is in focus, optionally a time indication of the duration of the content item, and optionally a reactions preview identifying a user's friends that reacted to the content item. All cells displayed in any of the presentation arrangements are interactive so that when tapped by the user or selected by the user, the corresponding content item (e.g., video) is retrieved and played back in full screen.

After all of the content items available in the messaging client application 104 have been processed according to the rules specified in FIG. 2B, the content item presentation arrangement system 124 generates a display in which all of the content items are presented in their corresponding category and presentation arrangement. The content item presentation arrangement system 124 selects the order in which the categories and corresponding content items are presented based on the ordering. For example, the content item presentation arrangement system 124 may determine that the "hero tile" category is always positioned first in the list, followed by the "my shows" category, followed by the "reactions from friends" category, and so forth. Then, after the "popular on messaging application" category, the content item presentation arrangement system 124 may dynamically order various other categories based on a profile or other suitable criteria. For example, at a first point in time, the content item presentation arrangement system 124 may determine that "because you reacted" category is more important or matches a user profile better than a "watch it again" category. As a result, the content item presentation arrangement system 124 presents the "because you reacted" category above the "watch it again" category and after the "popular on messaging application" category when the user accesses the content browsing screen at the first point in time. At a later point in time, the content item presentation arrangement system 124 may determine that a "watch it again" category is more important or matches a user profile better than a "because you reacted" category. As a result, the content item presentation arrangement system 124 presents the "watch it again" category above the "because you reacted" category when the user accesses the content browsing screen at the later time.

Video play position information 216 identifies a list of user interaction information associated with various play positions of one or more content items. For example, user interaction data 207 may store a user reaction to a given content item. The user reaction to the given content item is associated with a play position that is stored for the given content item in video play position information 216. The stored play position identifies the specific play position and/or segment within the content item during which the user reacted to the given content item.

View counts 217 stores the view count for each content item. The view count is dynamically updated as different users view the content items available on the messaging client application 104. The view counts 217 also indicates whether a given view count for a piece of content item corresponds to trending content or popular content. The view counts 217 also stores an aggregated view count or average view count for all content that was made available within a certain period of time (e.g., the last 7 days). The view counts 217 stores thresholds that are used to compare with the view count for a given content item to determine whether the view count is trending or popular. For example, the view counts 217 may store a 50% above average threshold to indicate that if a view count within a given period of time for a content item is more than 50% of the average view counts of the content made available within the given period of time, then that view count for the content item is determined to correspond to trending content. Otherwise, the view count is determined to correspond to popular content.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
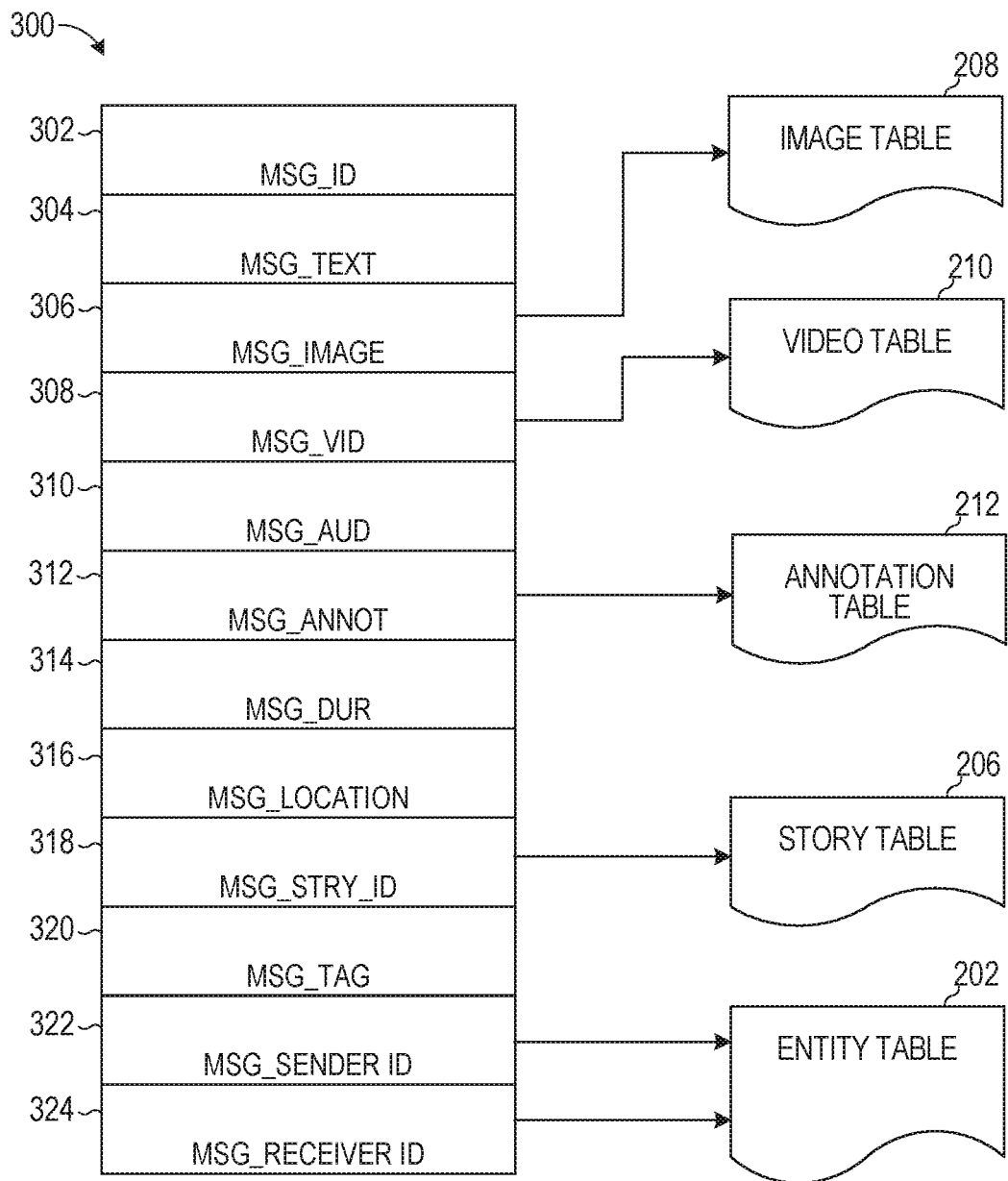
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
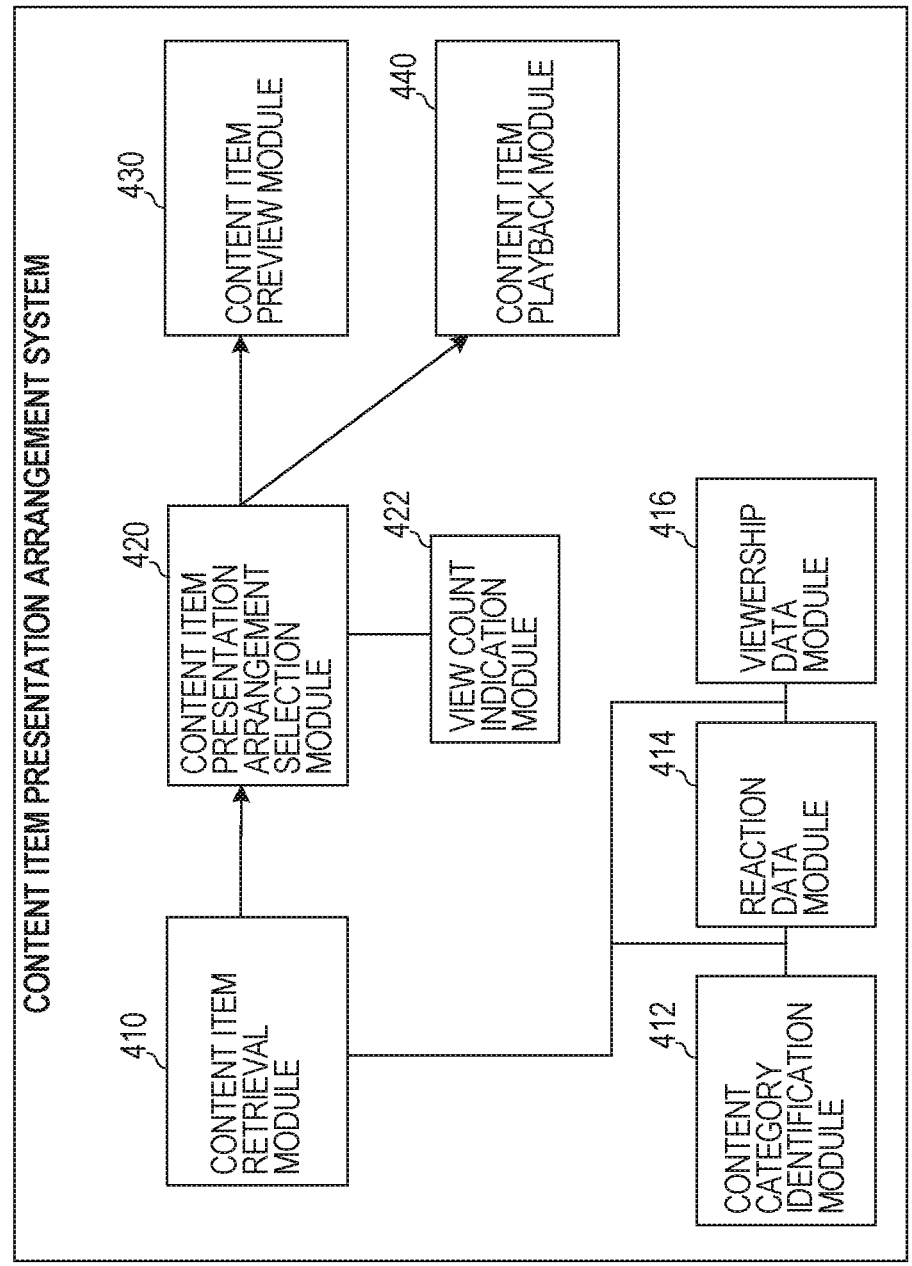
FIG. 4 is a block diagram showing an example content item presentation arrangement system, according to example embodiments.
Figure 5A:
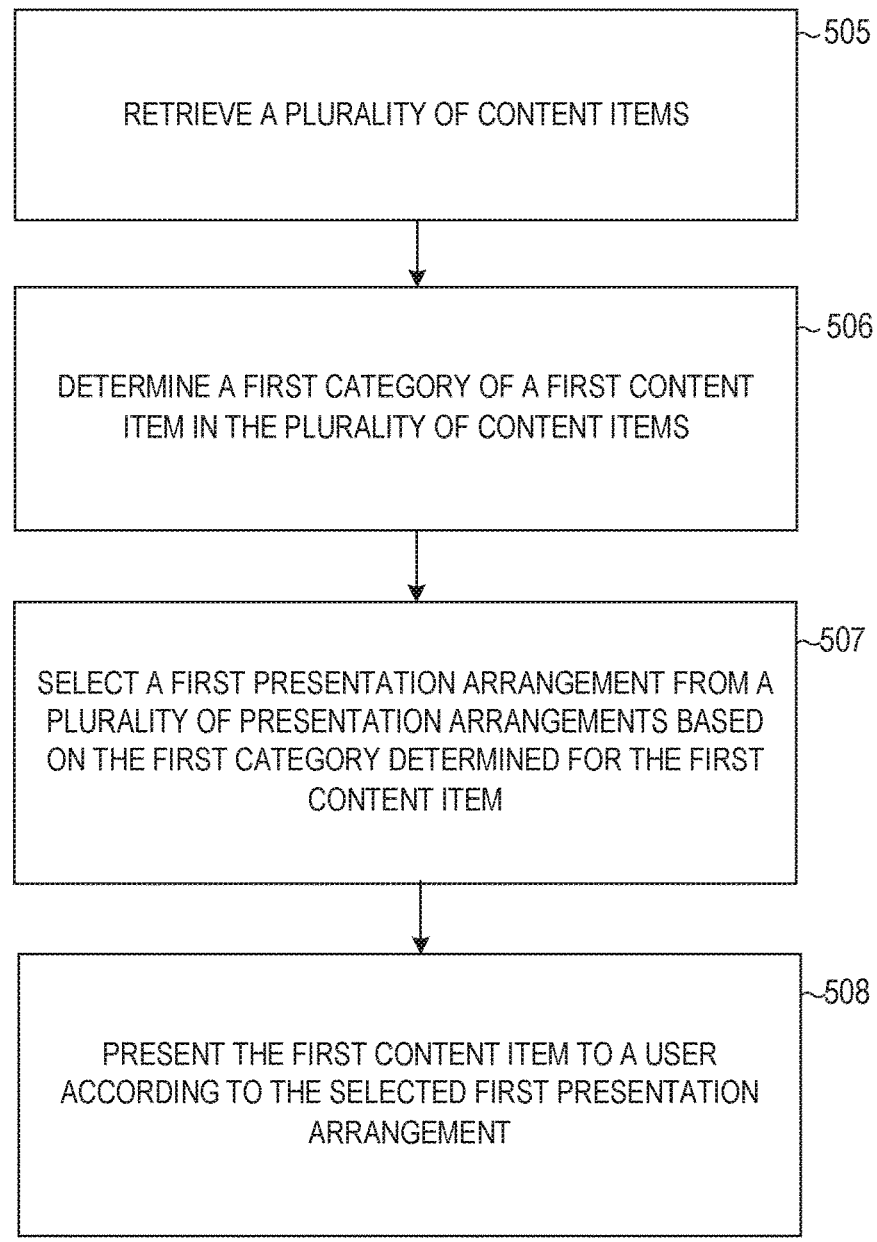
FIGS. 5A-E are flowcharts illustrating example operations of the content item presentation arrangement system, according to example embodiments.
Figure 5B:
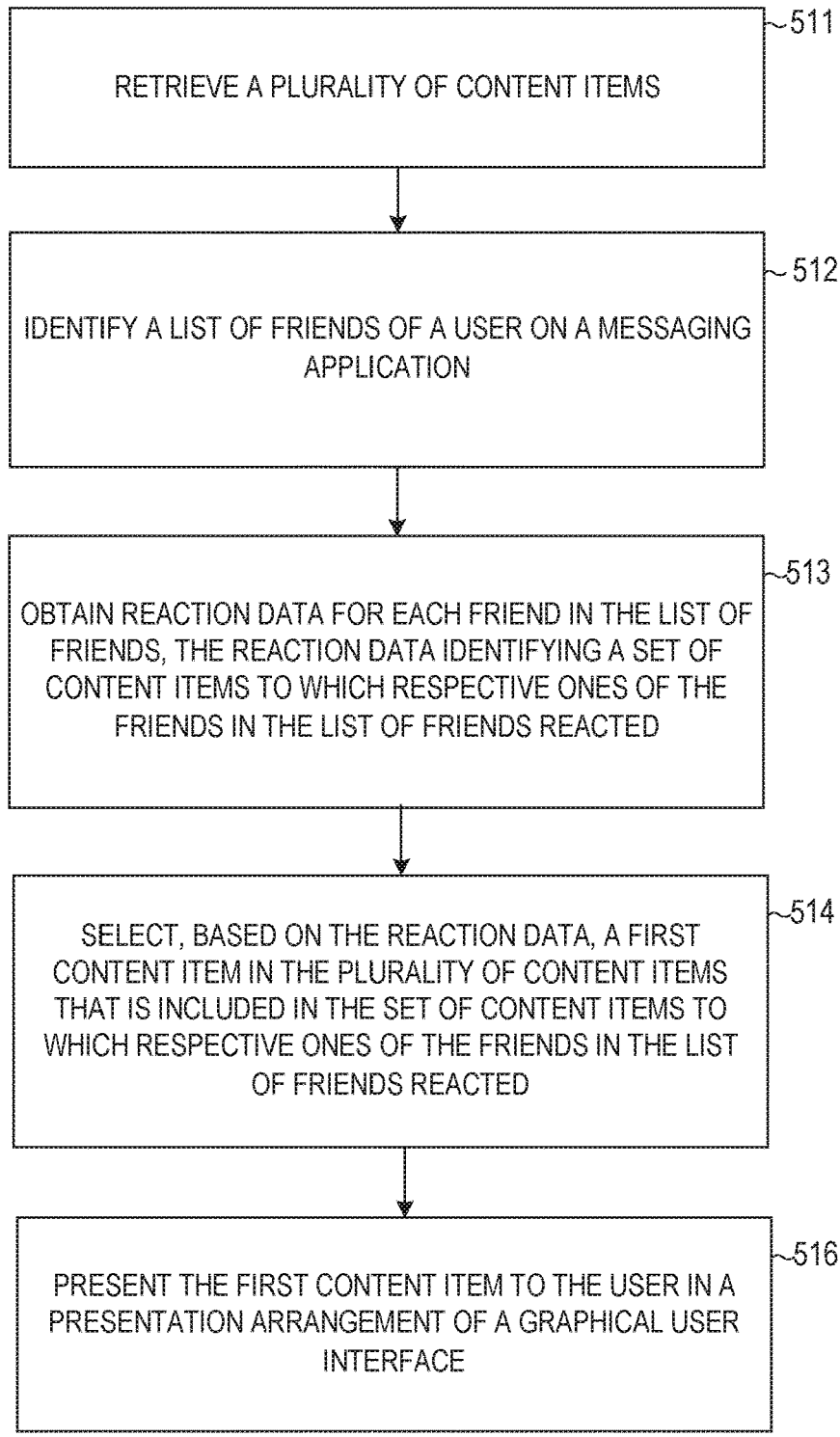
Figure 5C:
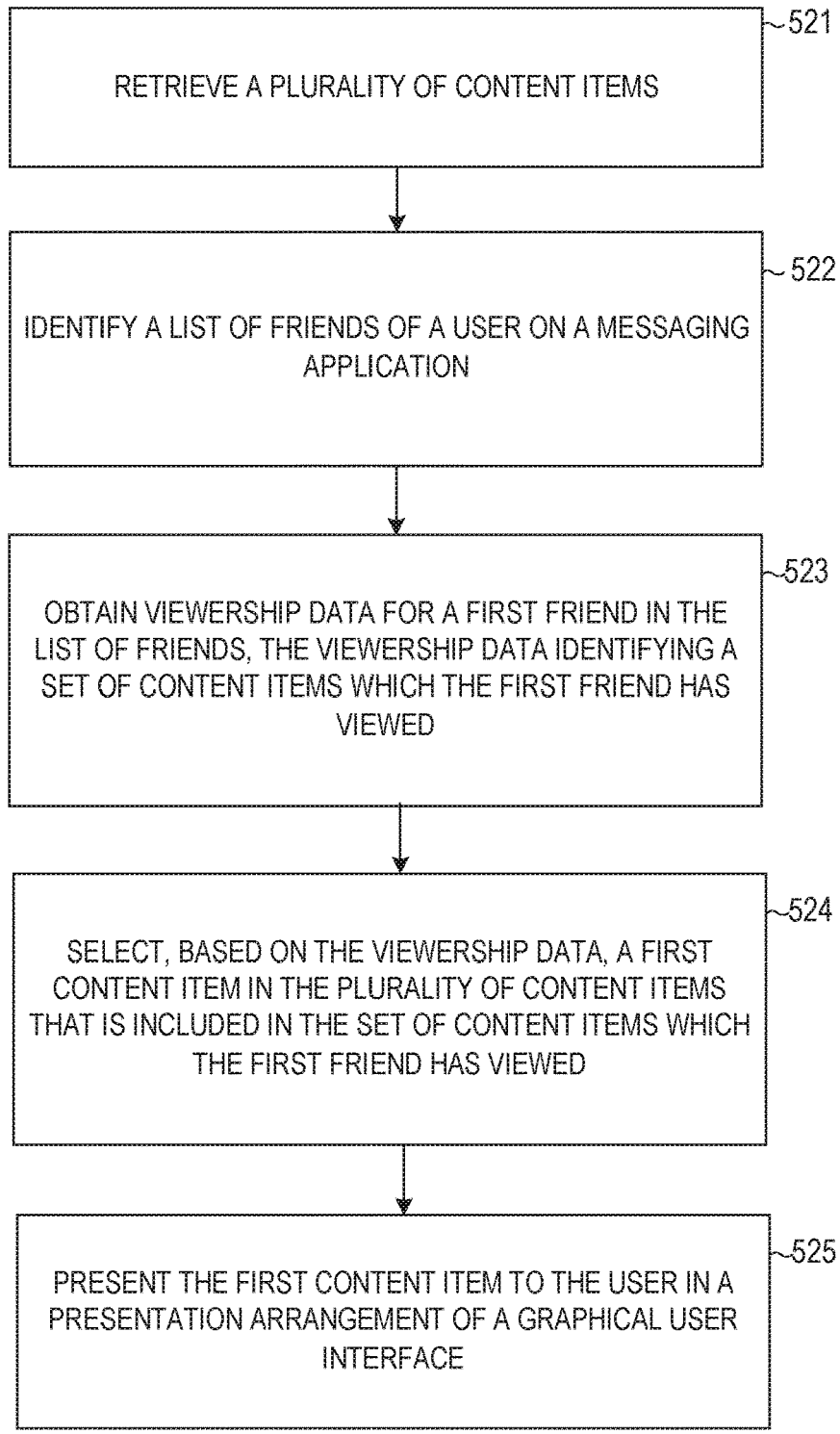
Figure 5D:
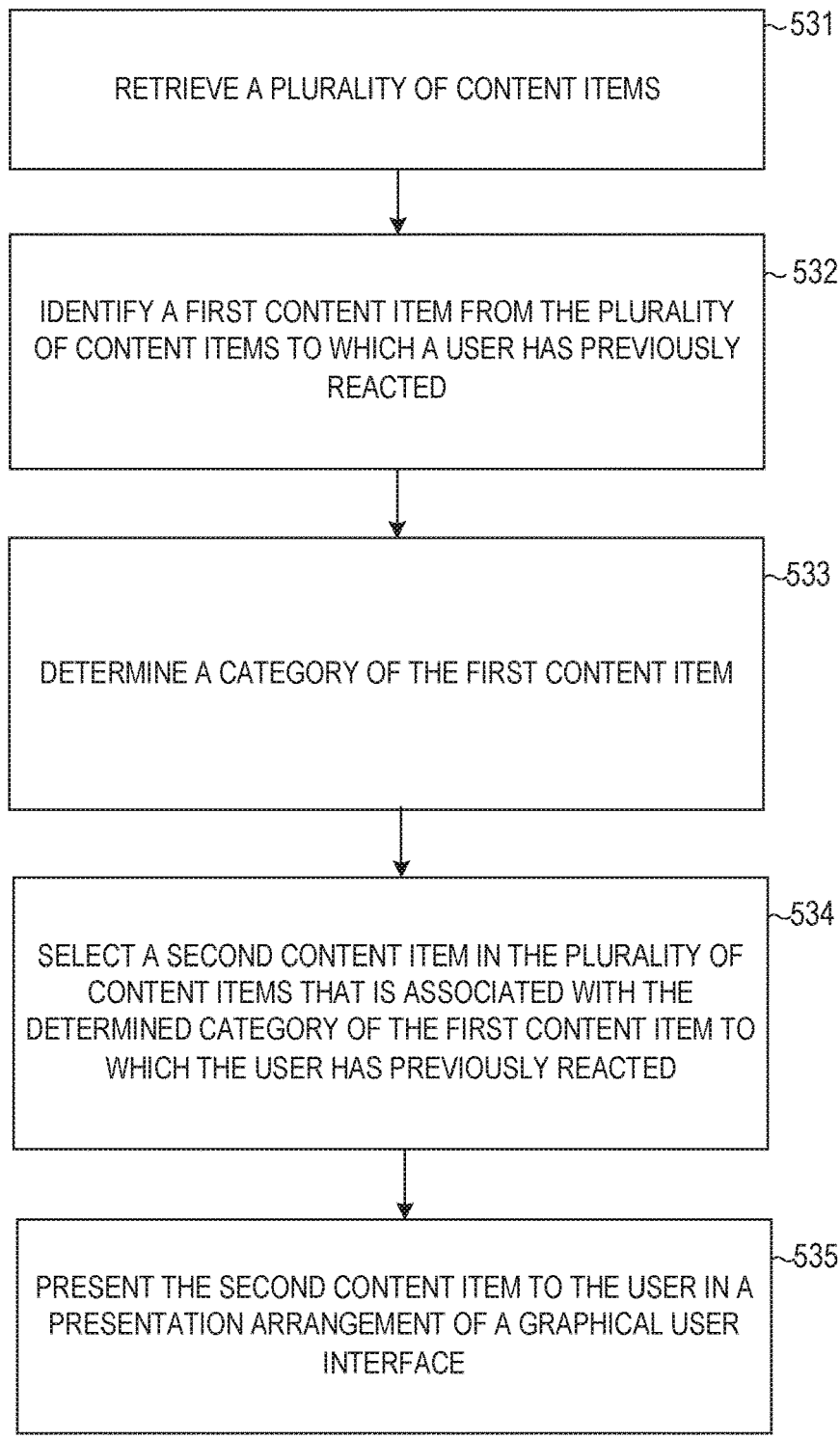
Figure 5E:
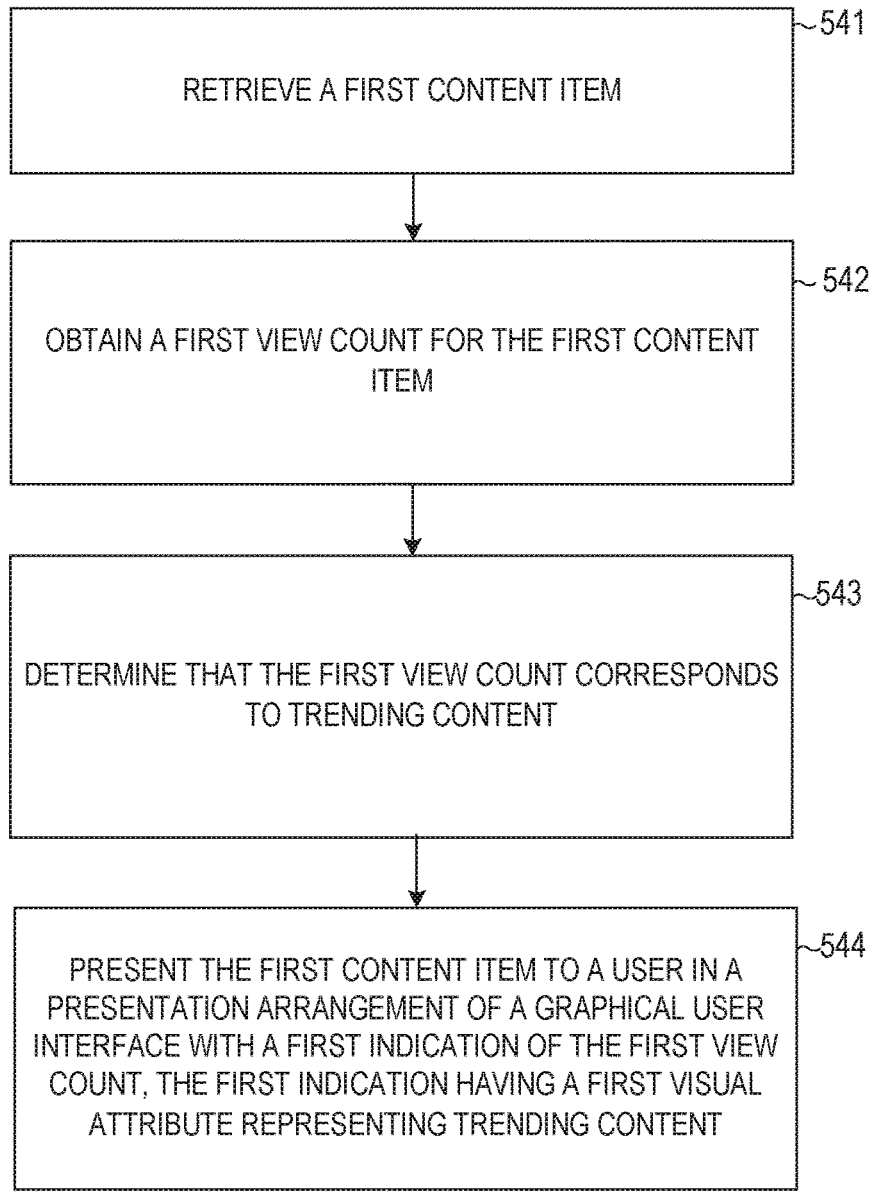

FIG. 4 is a block diagram showing an example content item presentation arrangement system 124, according to example embodiments. Content item presentation arrangement system 124 includes a content item retrieval module 410, a content category identification module 412, a reaction data module 414, a viewership data module 416, a content item presentation arrangement selection module 420, a view count indication module 422, a content item preview module 430, and a content item playback module 440.

In some embodiments, the content item presentation arrangement system 124 presents a user interface that includes a plurality of content navigation options and, in response to the client device 102 receiving a user selection of a content browsing option, the content item retrieval module 410 retrieves a plurality of content items. In an embodiment, the content item retrieval module 410 retrieves a set of content items that have been recently (in the past 7 days) been made available for access by users of the messaging client application 104. In an embodiment, the content item retrieval module 410 also retrieves a set of popular and/or trending content that has been made available on the messaging client application 104 for a longer period of time (e.g., 14 days). In some cases, each retrieved content item includes a category associated with it. In some other cases, the content item retrieval module 410 instructs the content category identification module 412 to identify or determine a category for each or a given subset of content items.

In some embodiments, the content category identification module 412 determines a category for a given content item based on reaction data provided by the reaction data module 414 for the given content item. For example, the content category identification module 412 may instruct the reaction data module 414 to retrieve reaction data from the user interaction data 207. The content category identification module 412 may determine if the reaction data indicates that a reaction from one of the friends of the user on the messaging client application 104 is available. If so, the content category identification module 412 may determine that the given content item is associated with the "reaction from friends" category. In some cases, the content category identification module 412 may identify multiple categories associated with a given content item. In such cases, the content item may be listed in multiple categories in a user interface. Alternatively, the content category identification module 412 may select one of the categories based on a user profile. For example, the content category identification module 412 may determine that the user typically accesses content items that are presented in a "reaction from friends" category more often than a "my shows" category. In such cases, if a given content item is determined to correspond to both of these categories, the content category identification module 412 may associate the given content item with the "reaction from friends" category and not the "my shows" category. Specifically, the content category identification module 412 informs the content item retrieval module 410 that the given content item is associated with only the "reaction from friends" category.

As another example, the content category identification module 412 may instruct the viewership data module 416 to retrieve viewership data from the user interaction data 207. The content category identification module 412 may determine if the viewership data indicates that a given content item was viewed by one of the friends of the user on the messaging client application 104. If so, the content category identification module 412 may determine that the given content item is associated with the "friends are watching" category.

In some cases, the content category identification module 412 processes metadata, audio, and/or video content of each content item. Based on known heuristics and other machine learning techniques, the content category identification module 412 selects a given category (e.g., comedy, action, drama) with which to associate the given content item. In some cases, the content category identification module 412 uses the category determined for a given content item to identify one or more other content items that are associated with the same category. For example, if the content category identification module 412 determines that a given content item has been reacted to by the user, based on the reaction data, the content category identification module 412 determines that the given content item is associated with the "because you reacted" category. In such cases, the content category identification module 412 identifies the canonical category (e.g., comedy or action) of the given content item and searches a plurality of other content items for another content item that is associated with the same canonical category. This plurality of other content items may be the same or different from the content items retrieved by the content item retrieval module 410. After retrieving the plurality of other content items, the content category identification module 412 selects a second content item associated with the same canonical category and matching a user profile to provide to the content item retrieval module 410 for presentation in the "because you reacted" category.

After the content items retrieved by the content item retrieval module 410 are categorized by the content category identification module 412, the categorized content items are provided to the content item presentation arrangement selection module 420. The content item presentation arrangement selection module 420 accesses the presentation arrangement rules 209 and determines a presentation arrangement for each of the categorized content items. Specifically, the content item presentation arrangement selection module 420 identifies the matching category 220 for each content item and determines the presentation arrangement type 222 associated with the matching category 220 for each content item. The content item presentation arrangement selection module 420 retrieves a tile or cover art for each content item having the image size or aspect ratio that corresponds to the presentation arrangement type 222 determined for the content item.

The content item presentation arrangement selection module 420 also ranks and dynamically positions each content item within its corresponding category based on a user profile. For example, the content item presentation arrangement selection module 420 ranks and positions all of the content items within the "reactions from friends" category and then ranks and positions all of the content items within the "trending now" category. For example, the content items presented in the "reaction from friends" category may be dynamically ordered based on how often the user consumes content generated by one friend over another. For example, the "reaction from friends" category includes a first content item to which a first friend reacted and a second content item to which a second friend reacted. The content item presentation arrangement selection module 420 may access consumption data from the messaging client application 104 indicating how often the user accesses content generated by various friends. The content item presentation arrangement selection module 420 may determine that the user consumes content generated by the second friend more often or for longer duration than the first friend. In response, the content item presentation arrangement selection module 420 may position the second content item to which the second friend reacted ahead, before, or above the first content item to which the first friend reacted. In another embodiment, the content items presented in the "reaction from friends" category may be similarly dynamically positioned based on how often the user communicates with various friends, a number of messages exchanged between the user and the friends, and/or importance of the messages exchanged and whether such messages include media content, such as videos or images in addition to text.

The content item presentation arrangement selection module 420 instructs the view count indication module 422 to compute a view count for each content item in each category. The view count indication module 422 accesses the view counts 217 stored for each content item to determine the current number of views of each content item. In some cases, the current number of views reflects the total number of views for the given content item since the time when the content item was first made available for consumption in the messaging client application 104. In some cases, the current number of views reflects only those views that took place within a specified time period (e.g., within the past 7 days). The view count indication module 422 computes the view count on an episode of a series basis and on a season as a whole basis. Namely, if a content item is an episode of a series, the view count indication module 422 increments the view count for the episode when a given user views the episode for more than three seconds. The view count indication module 422 also increments the view count of the season the episode is part of when any episode of the season is watched for more than three seconds or whenever a single unique user views all episodes of the series. The view counts for the episode and the season may be displayed separately in the cell or tile of the content item.

The view count indication module 422 computes an average view count across all of the content items available in the messaging client application 104 over a specified time period (e.g., within the past 7 days). The view count indication module 422 computes a value that is a certain percentage (e.g., 50%) greater than the average view count. The view count indication module 422 compares the view count within the past specified time period for each content item to the computed value to determine whether the given content item is trending. If the view count of the given content item exceeds the computed value, then the view count indication module 422 determines that the view count and content associated with the view count is trending. Otherwise, the view count indication module 422 determines that the view count is popular. If the view count is less than the computed average view count by more than a threshold amount, the view count indication module 422 determines that the view count is neither trending nor popular. In some implementations, the view count indication module 422 recomputes the view counts and re-evaluates whether a given content item is popular or trending every day or every predetermined period of time (e.g., every 7 days).

In some cases, the view count indication module 422 only selects the top ten percent of content items that are determined to be trending as being trending for inclusion in a list of trending content. For example, if the view count indication module 422 determines that the view counts of 15% of the content items correspond to trending content, the view count indication module 422 may only select 10% of the content items rather than all 15% that are trending to indicate the view counts as trending. The 10% that are selected are selected by comparing the view counts of all the 15% of the trending contents and selecting the view counts that are greater than the remaining 5% of the content. In some cases, the recency of being made available on the messaging client application 104 is considered in selecting the top 10%. For example, if a first content item does not qualify to be in the top 10% but has been more recently made available for consumption on the messaging client application 104 than a second content item that does qualify to be in the top 10%, then the view count indication module 422 replaces the second content item with the first content item in the list of trending content. The view count of any content item can be presented in any graphical user interface in which the corresponding content item (e.g., video of the content item) or representation of the content item (e.g., title or cover art) is presented.

The content item presentation arrangement selection module 420 associates the view count received from the view count indication module 422 with each content tile representing each content item. In some cases, the content item presentation arrangement selection module 420 includes the view count within the tile or cell representing a given content item. In some cases, the content item presentation arrangement selection module 420 includes the view count next to or adjacent the tile or cell representing the given content item. The content item presentation arrangement selection module 420 adjusts the view counts presented for each content item in real time as the user browses content. In some embodiments, the content item presentation arrangement selection module 420 animates a view count representing popular content differently than the view count representing trending content. For example, as the user browses content and when a given tile representing popular content is revealed in the display, a view count corresponding to popular content is scrolled once to reveal an updated view count (e.g., the view count may first show 112k total views and is then immediately scrolled up and animated to show 114k total views). As another example, as the user browses content and when a given tile representing trending content is revealed in the display, a view count corresponding to trending content is scrolled twice to reveal twice updated view counts (e.g., the view count may first show 312k total views, the view count of 312k total views is then immediately scrolled up and animated to show 314k total views, and the 314k view count is then immediately scrolled up and animated again to show 318k total views).

The content item presentation arrangement selection module 420 provides the content arranged in the various presentation arrangements to the content item preview module 430. The content item preview module presents a screen to the user that includes all of the content arranged in the respective categories that are ordered according to the rules specified in FIG. 2B. The content item preview module 430 allows a user to navigate or scroll the list of content items presented up and down (e.g., by performing a gesture, such as swiping up/down on the screen). As the user scrolls the list, new content items in different categories and presentation arrangements are revealed. In an embodiment, when a given content item in a given presentation arrangement comes into focus (e.g., enters the center of the screen) while the user navigates or scrolls the list, a preview video clip of content associated with the given content item is automatically played. In an embodiment, the preview video clip includes a loop of the first 15 seconds of the corresponding content after the user stops scrolling for more than 1 second while the cell is in the focus position (e.g., in the center of the screen). The preview video clip is played (with or without sound) and presented in place of the cover art presented in the content tile for the given content item. As the user continues scrolling, the preview clip of the given content item pauses or stops and a preview clip of content associated with a different content item begins playing in place of the cover art presented in the tile for the different content item. In this way, only one preview clip of content is presented to the user at a time. In an embodiment, when the preview clip begins play, the content item preview module 430 generates haptic feedback (e.g., by vibrating the client device 102 on which the user interface is displayed for a short interval, such as vibrating for 1 millisecond). This alerts the user to the fact that the preview clip has begun playing.

In some embodiments, the tile representing the content changes based on whether the content in the tile is not watched (has not been viewed by the user), is autoplaying, has been partially watched by the user, or has been fully watched. In an example, if the tile represents content that has not been viewed by the user, an image of a frame of the corresponding content is presented in the tile together with the total duration, runtime, or number of segments of the content also inside of the tile. If the tile represents a preview video clip that is autoplaying in the tile, then the total duration, runtime, or number of segments of the corresponding content is presented in the tile together with an equalizer, also inside of the tile, that is animated as the preview clip plays. If the content has been partially viewed or watched by the user, then an image of a frame of the corresponding content is presented in the tile together with the remaining time left or remaining segments to complete viewing the content, also inside of the tile, and a transport bar at the bottom of the tile that is partially filled in. If the content has been completely viewed or watched by the user, then an image of a frame of the corresponding content is presented in the tile together with a transport bar at the bottom of the tile that is completely filled in.

In some embodiments, the content item preview module 430 selects the preview clip to present in the content tiles from a plurality of preview clips associated with a given content item. For example, each content item may be associated with an episode preview clip and a series preview clip. The content item preview module 430 selects either the episode or the series preview clip based on a viewing history of the user for whom the preview clip is presented. Specifically, the content item preview module 430 determines that a first content item is part of a serial collection of content items (e.g., the first content item is an episode in a series of episodes). The content item preview module 430 also retrieves a viewing history for the user by accessing viewership data module 416 to determine that the user has not viewed any content items in the serial collection of content items. In response, the content item preview module 430 selects a preview clip representing the entire serial collection of content items (e.g., a preview clip promoting the series). Alternatively, the content item preview module 430 may determine that the user has viewed a given content item in the serial collection of content items. In response to determining that the user has viewed the given content item, the content item preview module 430 retrieves a preview video clip of a next content item in the serial collection that sequentially follows the given content item. Specifically, if the content tile represents a series and the content item preview module 430 determines that the user has seen episode number 5 in the series, the content item preview module 430 retrieves the preview clip associated with episode number 6 in the series. The retrieved preview video clip is presented in the content tile for the series. Alternatively, if the content tile represents a series and the content item preview module 430 determines that the user has seen episode number 5 in the series, the content item preview module 430 retrieves the preview clip associated with episode number 7 in the series instead of episode number 6 if the content item preview module 430 determines, based on a user profile, that the user is more likely to watch episode number 7 instead of episode number 6.

In some embodiments, the content item presentation arrangement selection module 420 receives a user selection of a tile associated with a given content item presented in the presentation arrangement. For example, a user may tap on the screen at a position corresponding to the tile presentation. In response, the content item presentation arrangement selection module 420 instructs the content item playback module 440 to launch a video player for playing content associated with the content item corresponding to the selected tile. The video player may launch in full screen or in a partial portion of the screen. The video player includes a browse bar identifying the title of the content item being presented, description, and content source. The browse bar may be presented at the top of the screen and may also identify other content sources that are available. The browse bar can be navigated by the user to view a list of content items that will be presented next automatically after the current content item finishes being played back. In some embodiments, the next content item is the content item that follows the content item in list of content items presented in a given category.

In some embodiments, the next content item is the first content item of an adjacent next category that is presented to the user in the list of categories. For example, if the user selects to playback the second content item displayed in the "reactions from friends" category, the content item playback module 440 may automatically playback the third content item displayed in the same "reactions from friends" category when playback of the second content item completes. Alternatively, if the user selects to playback the second content item displayed in the "reactions from friends" category, the content item playback module 440 may automatically playback the first content item displayed in the adjacent next "trending now" category when playback of the second content item completes.

The video player includes a transport bar at the bottom of the display. The transport bar may show the user how much of the content has been buffered as the content is being downloaded. The transport bar also shows divisions of different segments of the show. The transport bar includes representations, such as avatars, of the user's friends who reacted to the content item being played back. The transport bar may fade away from being displayed after a specified period of time (e.g., 3 seconds). The transport bar is revealed automatically when the user pauses playback of the content.

The representations may be visually and graphically positioned along the transport bar based on the play position corresponding to the reaction received from the friend. For example, if a first friend made a comment about the content item at a given playback position 1:30 (min:sec), an avatar representing the first friend may be placed adjacent or proximate the given playback position 1:30 to alert the user about the reaction made by the first friend and when the reaction was made. The user can tap or select the representation to view the reaction before playback reaches the given playback position. In some embodiments, the content item playback module 440 automatically presents the reaction made by the first friend when the playback of the content reaches the given play position. In an embodiment, the user can respond directly to the first friend by replying to the reaction with text, image, or video. A message is sent to the first friend with the response via a chat interface of the messaging client application 104.

In some embodiments, to react to content being presented, a user can perform a gesture, such as swiping up while the content is being played back. The user can input the reaction, such as text, image, or video, and the content item playback module 440 stores the reaction in association with the playback position of the content when the user performed the gesture. The content item playback module 440 may automatically pause playback when the user performs the gesture to provide a reaction or the content may continue to be played back while the user inputs the reaction. After the reaction is input by the user and stored in association with the playback position, friends of the user can view the reaction when they access the same content item. Also, the content item to which the user reacted can be included and become visible in a "reaction from friends" category that is presented to the user's friends.

In some embodiments, the content item playback module 440 receives a user request to minimize the video player while the content is being played back. For example, the user can position a finger on the screen and slide the finger down the screen to instruct the content item playback module 440 to minimize the video player. As the user slides the finger down the screen, the content item playback module 440 continuously and dynamically reduces a size of the video player until a threshold size is reached. As the size is reduced, the video player appears to be dragged down along the user's finger position on the screen. Once the threshold size has been reached and/or when the user releases the finger from the screen, the player remains in the fixed minimized size and is positioned over other content displayed on the screen. In an embodiment, the other content can be another display screen (e.g., a camera or chat interface) of the messaging client application 104 and/or the content browsing screen in which the content item presentation arrangements in various categories are displayed. The content can continue to be played back in the minimized manner while the user is performing other actions in the other screen that is shown. When the user touches the minimized video and double taps it or drags it towards the center of the screen, the content item playback module 440 dynamically increases the size of the video until the full size screen threshold is reached.

FIGS. 5A-E are flowcharts illustrating example operations of the content item presentation arrangement system 124 in performing processes 500-504, according to example embodiments. The processes 500-504 may be embodied in computer-readable instructions for execution by one or more processors such that the operations of the processes 500-504 may be performed in part or in whole by the functional components of the messaging server system 108 and/or third-party application 105; accordingly, processes 500-504 are described below by way of example with reference thereto. However, in other embodiments, at least some of the operations of the processes 500-504 may be deployed on various other hardware configurations. The processes 500-504 are therefore not intended to be limited to the messaging server system 108 and can be implemented in whole, or in part, by any other component. Some or all of the operations of processes 500-504 can be in parallel, out of order, or entirely omitted.

At operation 505, the content item presentation arrangement system 124 retrieves a plurality of content items.

At operation 506, the content item presentation arrangement system 124 determines a first category of a first content item in the plurality of content items.

At operation 507, the content item presentation arrangement system 124 selects a first presentation arrangement from a plurality of presentation arrangements based on the first category determined for the first content item.

At operation 508, the content item presentation arrangement system 124 presents the first content item to a user according to the selected first presentation arrangement.

At operation 511, the content item presentation arrangement system 124 retrieves a plurality of content items.

At operation 512, the content item presentation arrangement system 124 identifies a list of friends of a user on a messaging application.

At operation 513, the content item presentation arrangement system 124 obtains reaction data for each friend in the list of friends, the reaction data identifying a set of content items to which respective ones of the friends in the list of friends reacted.

At operation 514, the content item presentation arrangement system 124 selects, based on the reaction data, a first content item in the plurality of content items that is included in the set of content items to which respective ones of the friends in the list of friends reacted.

At operation 516, the content item presentation arrangement system 124 presents the first content item to the user in a presentation arrangement of a graphical user interface.

At operation 521, the content item presentation arrangement system 124 retrieves a plurality of content items.

At operation 522, the content item presentation arrangement system 124 identifies a list of friends of a user on a messaging application.

At operation 523, the content item presentation arrangement system 124 obtains viewership data for a first friend in the list of friends, the viewership data identifying a set of content items which the first friend has viewed.

At operation 524, the content item presentation arrangement system 124 selects, based on the viewership data, a first content item in the plurality of content items that is included in the set of content items which the first friend has viewed.

At operation 525, the content item presentation arrangement system 124 presents the first content item to the user in a presentation arrangement of a graphical user interface.

At operation 531, the content item presentation arrangement system 124 retrieves a plurality of content items.

At operation 532, the content item presentation arrangement system 124 identifies a first content item from the plurality of content items to which a user has previously reacted.

At operation 533, the content item presentation arrangement system 124 determines a category of the first content item.

At operation 534, the content item presentation arrangement system 124 selects a second content item in the plurality of content items that is associated with the determined category of the first content item to which the user has previously reacted.

At operation 535, the content item presentation arrangement system 124 presents the second content item to the user in a presentation arrangement of a graphical user interface.

At operation 541, the content item presentation arrangement system 124 retrieves a first content item.

At operation 542, the content item presentation arrangement system 124 obtains a first view count for the first content item.

At operation 543, the content item presentation arrangement system 124 determines that the first view count corresponds to trending content.

At operation 544, the content item presentation arrangement system 124 presents the first content item to a user in a presentation arrangement of a graphical user interface with a first indication of the first view count, the first indication having a first visual attribute representing trending content.

Figure 6:
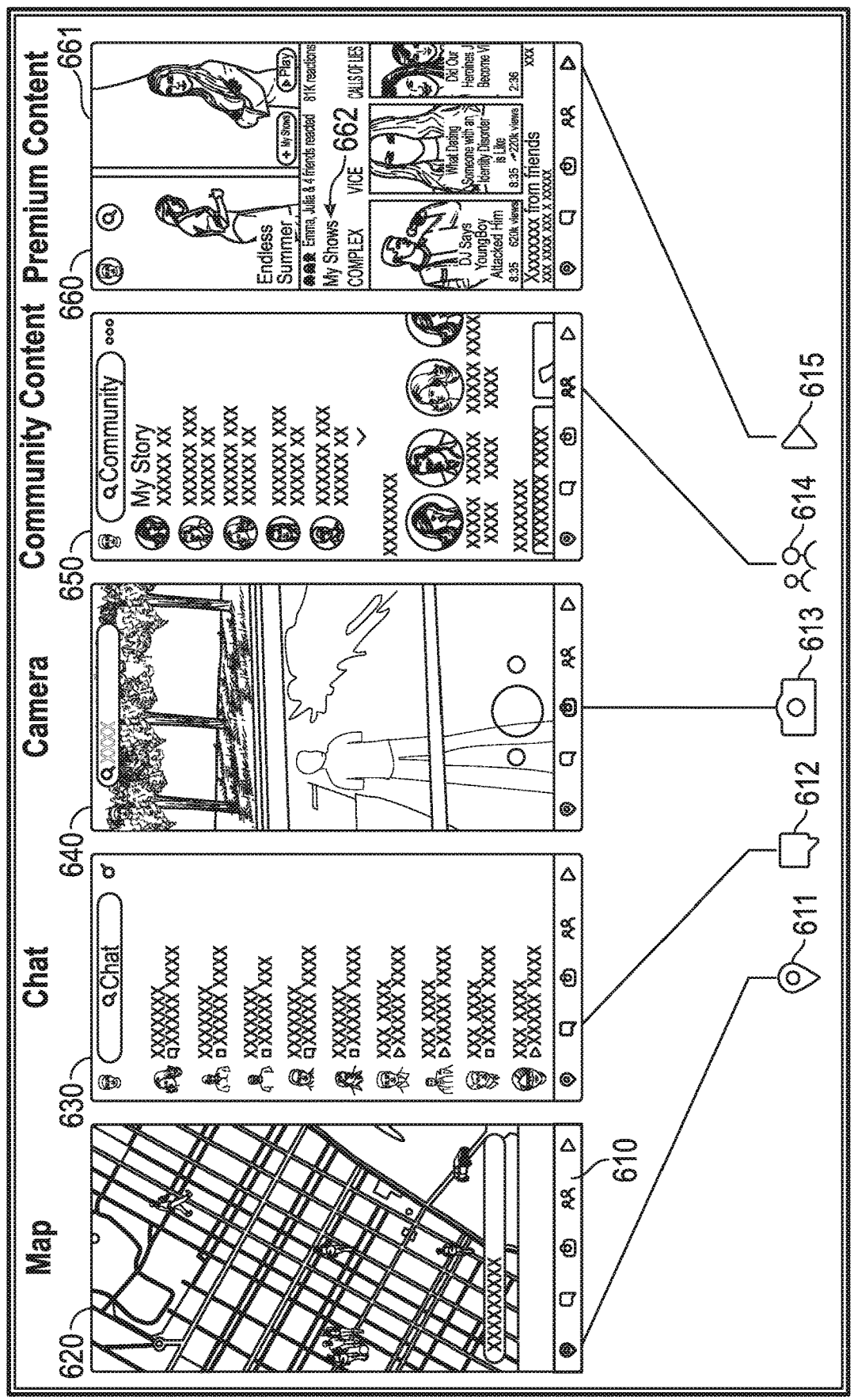
FIGS. 6, 7A, 7B, and 8 are illustrative inputs and outputs of the content item presentation arrangement system, according to example embodiments.

FIGS. 6, 7A, 7B, and 8 are illustrative inputs and outputs of the content item presentation arrangement system 124, according to example embodiments. As shown in FIG. 6, the messaging client application 104 presents a user interface with a plurality of options 610. A first option 611, when selected by a user, instructs the messaging client application 104 to launch a map-based social media interface 620. In the map-based social media interface 620, a user can view representations or avatars of their friends that are positioned on a map based on the corresponding locations of their friends. A second option 612, when selected by a user, instructs the messaging client application 104 to launch a chat interface 630. The chat interface 630 allows a user to view and chat with one or more friends or groups of friends. A third option 613, when selected by a user, instructs the messaging client application 104 to access a camera interface 640. The camera interface 640 allows a user to capture images or videos, edit the images or videos, and share the images or videos with one or more friends. A fourth option 614, when selected by a user, instructs the messaging client application 104 to launch a community content interface 640. The community content interface 650 presents various collections of user-generated content and/or previously exchanged media content and messages between users of the messaging client application 104. A fifth option 615, when selected by a user, instructs the messaging client application 104 to access a content browse interface 660. The content browse interface 660 includes one or more content items each arranged in corresponding categories in different presentation arrangements.

As an example, the content browse interface 660 presents a first content item 661 in a hero tile presentation arrangement. The content browse interface 660 presents a plurality of other content tiles corresponding to a "my shows" category in a horizontal tile presentation arrangement. The content browse interface 660 simultaneously presents various content items in various tiles arranged in different presentation arrangements.

Figure 7A:
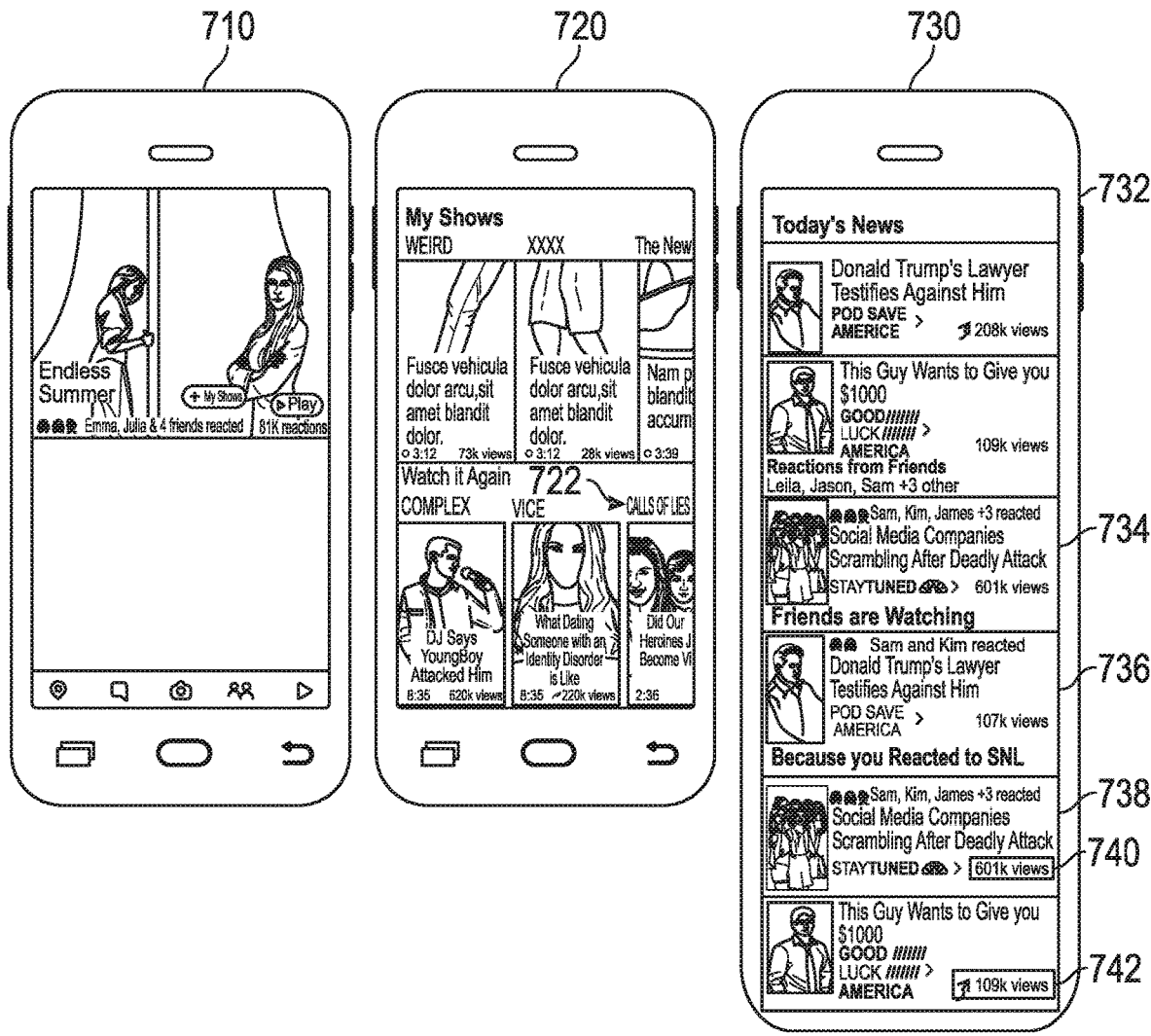

FIG. 7A shows a single content tile presented in a hero tile presentation arrangement 710. The hero tile presentation includes a cell in which a cover art or graphic representation of the content item is depicted. The hero tile cell includes a title of the content item, a number of reactions to the content item, and identifiers of one or more friends that reacted to the content item. FIG. 7A shows a set of content items presented in a horizontal arrangement in user interface 720. As shown, in the horizontal arrangement, each cell of a corresponding content item includes an image of a frame of the video of the content item and, inside of the image or frame, a title or description of the content item, a duration or number of segments or episodes of the content item, a content source, and number of views of the content item. As the user navigates the horizontal tiles in the horizontal arrangement in user interface 720, the content item presentation arrangement system 124 automatically presents a preview video clip of the corresponding content item as the content item comes into focus.

FIG. 7A shows a set of content items presented in a vertical arrangement in user interface 730. As shown, in the vertical arrangement, each cell of a corresponding content item includes an image of a frame of the video of the content item, a title or description of the content item, a duration or number of segments or episodes of the content item, and number of views of the content item. As the user navigates the vertical tiles in the vertical arrangement in user interface 730, the content item presentation arrangement system 124 automatically presents a preview video clip of the corresponding content item as the content item comes into focus. As shown, several categories of content are presented in the vertical presentation arrangement. For example, first a "today's news" category 732 is presented, next a "reactions from friends" category 734 is presented, then a "friends are watching" category 736 is presented, and lastly a "because you reacted" category 738 is presented.

In some cases, each category of content items is presented as the user scrolls down the user interface by swiping up along the screen. The "reactions from friends" category 734 identifies the names of all the friends of the user in the messaging client application 104 that reacted to the content items listed in the "reactions from friends" category under the title of the category. Within each cell of the content items represented in the "reactions from friends" category 734, the content item presentation arrangement system 124 presents avatars or representations of the friends who reacted along with their names. In an embodiment, only three avatars and/or names are presented and, if more than three friends reacted, the content item presentation arrangement system 124 specifies how many additional friends (e.g., +3 others) who also reacted to the content item depicted in the cell. The content item presentation arrangement system 124 selects the three friends to include in the representation based on recency of the friends' reactions and/or how often the user accesses content generated by the respective friend on the messaging client application 104.

The content item presentation arrangement system 124 also presents indications of the view count for each content item depicted in the user interfaces. The view count may graphically depict the number of views differently based on whether the corresponding view count and content is trending or popular. For example, a first view count indication 740 is presented as corresponding to popular content and appears more faded than a second view count indication 742 that corresponds to trending content. The second view count indication 742 also has an arrow pointing up indicating the content is trending. The first and second view count indications 740 and 742 are graphically animated in different ways when the corresponding cell in which the indications are presented is revealed.

Figure 7B:
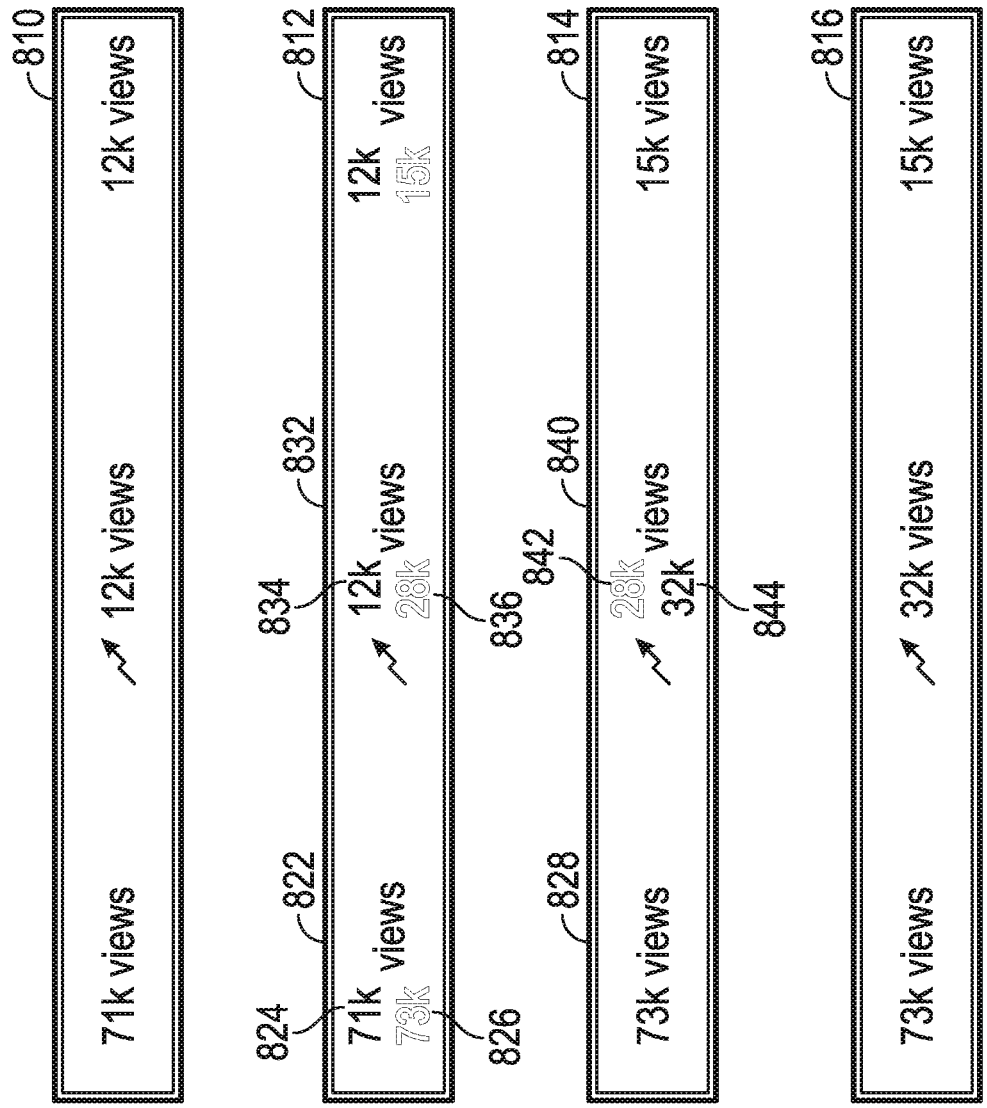

FIG. 7B shows how first and second view count indications 740 and 742 are graphically animated in different ways. For example, FIG. 7B shows three different view counts corresponding to three different content items. Initial display 810 shows the three view counts when the corresponding content items are initially revealed in the display screen when the user scrolls to the content items or cells representing the view counts. Immediately, within 1 millisecond of scrolling to reveal the cells that display the view counts, the initial display 810 transitions to display 812 in which the three view counts are animated a first time to show updated view counts. For example, a first view count 822 corresponding to popular content is graphically animated to show the initially displayed view count 824 (71k views) fading away, scrolling up and out of view while an updated view count 826 (73k views) scrolls into view. At the same time, a second view count 832 corresponding to trending content is graphically animated to show the initially displayed view count 834 (12k views) fading away, scrolling up and out of view while an updated view count 836 (28k views) scrolls into view. Then, within 2 milliseconds of scrolling to reveal the cells that display the view counts and after the view counts have been graphically animated a first time to display updated view counts, the display 812 transitions to display 814 in which only the trending view count 840 is animated a second time to show an updated view count. Specifically, the second view count 840 corresponding to trending content is graphically animated again to show the previously updated view count 842 (28k views) fading away, scrolling up and out of view while another updated view count 844 (32k views) scrolls into view while the first view count 828 remains stationary. Finally, after the view counts finish being graphically animated to show updates, screen 816 shows the view counts of the trending and popular contents static.

Figure 8:
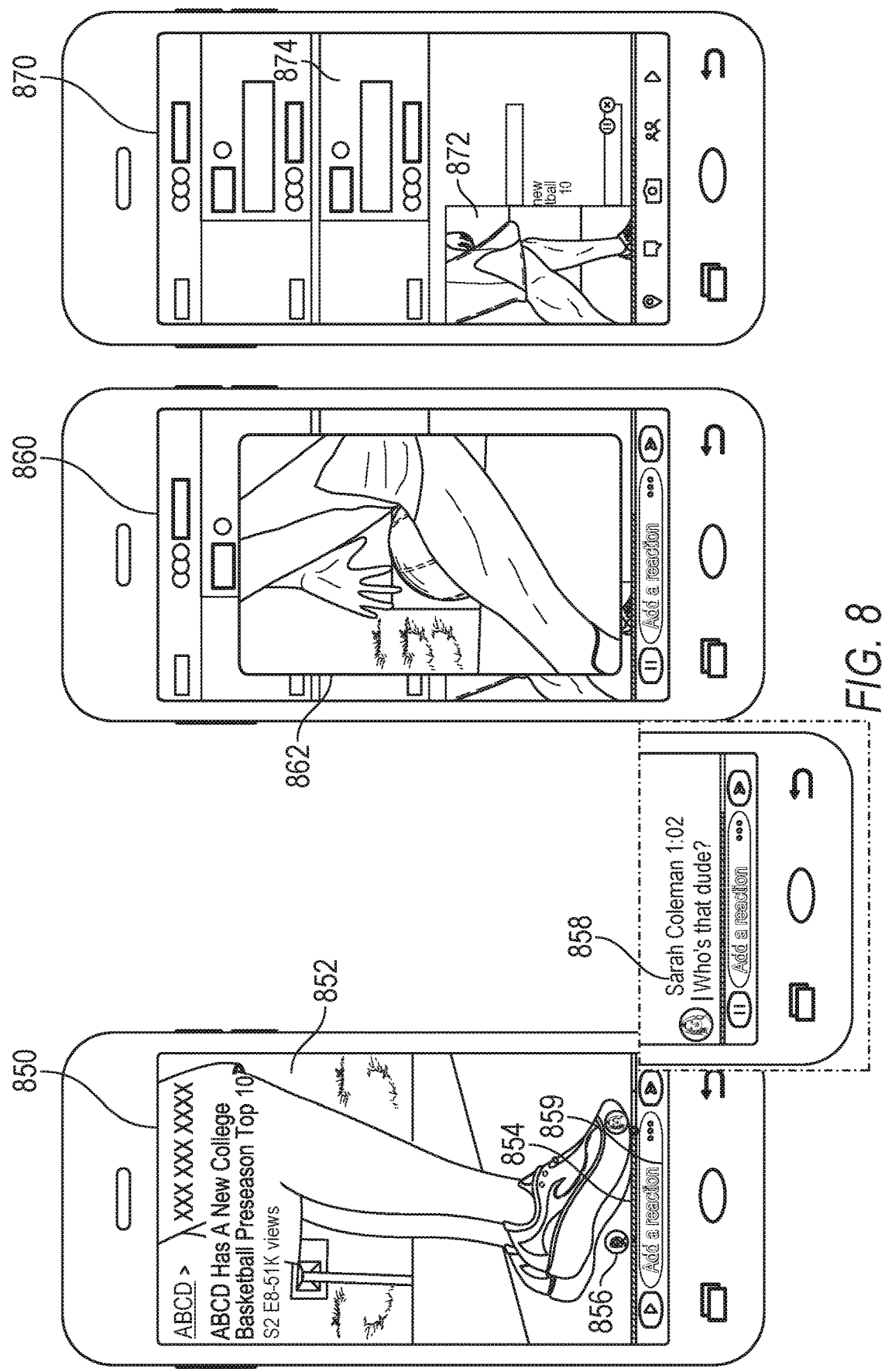

After a user selects a given content item, the content item presentation arrangement system 124 launches a video player that presents the content in full screen 850 as shown in FIG. 8. The video player includes a transport bar 854 that presents representations 856 of friends who have reacted to the content being played back. As an example, according to the disclosed embodiments, the methods include operations for receiving a user selection of a first content item in a presentation arrangement; launching a video player for playing content associated with the first content item in response to receiving the user selection; and presenting a transport bar in the video player, the transport bar including representations of friends of the user that viewed the first content item. The respective representations are time-indexed to indicate different points in time in the content item to which friend content relates. During playback, friend reactions are surfaced or presented when playback reaches a play point corresponding to a reaction.

The representations 856 are interactive, thereby allowing the user to select any given representation 856 to view the corresponding reaction from the friend. Specifically, in response to receiving a user selection of a representation that is presented, the video player retrieves the reactions stored for the friend corresponding to the representation in association with the content item and presents the retrieved reactions. In an implementation, the retrieved reactions are presented as an overlay on top of the video while the video continues to be played back. The video player also includes a browse bar 852 that presents information (e.g., title, content source, and view count) of the content being played and information about a content item that will automatically be played back when the current content item playback completes. When the playback reaches a given play position where a friend has reacted to the content, the video player presents details 858 of that reaction (e.g., presents what the friend commented or said about the content at the play position). The user can input a reaction or response in text region 859 and press a submit button to associate the response or reaction with the play position currently being played. The user can directly respond to the friend's comment, which instructs the messaging client application 104 to start a chat message with the friend who posted the comment.

While content is being played back by the video player in full screen, the user can touch the screen and perform a gesture of swipe down to shrink down the content to perform other functions. User interface 860 shows the video of the content gradually shrinking in size 862 as the user continues performing a gesture of swiping down the screen. When the content reaches a specific threshold size, the content stops being gradually reduced in size and remains at a fixed reduced size window 872. As shown in screen 870, other content or user interface screens 874 of the messaging client application 104 are presented behind or concurrently with the reduced size video window 872 while the video continues being played back. This allows the user to perform other functions, such as text messaging, chatting, capturing videos, and so forth while continuing to watch the video content. The user can touch and hold the video content shown in the reduced size window 872 and perform another gesture of swiping across or up the screen. This gradually increases the size of the video being played back until the full screen video is shown back in screen 850.

Figure 9:
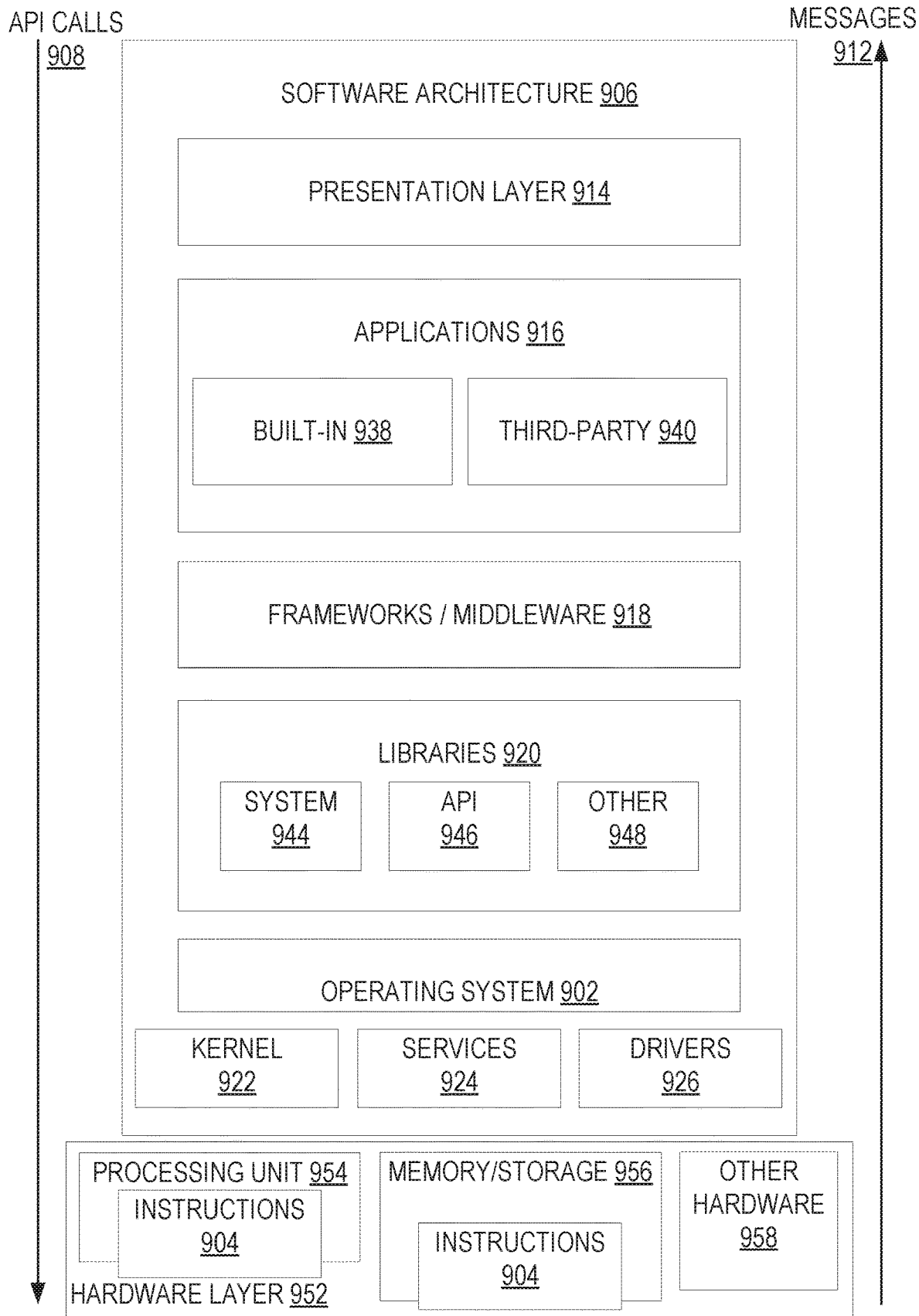
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic user interface functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
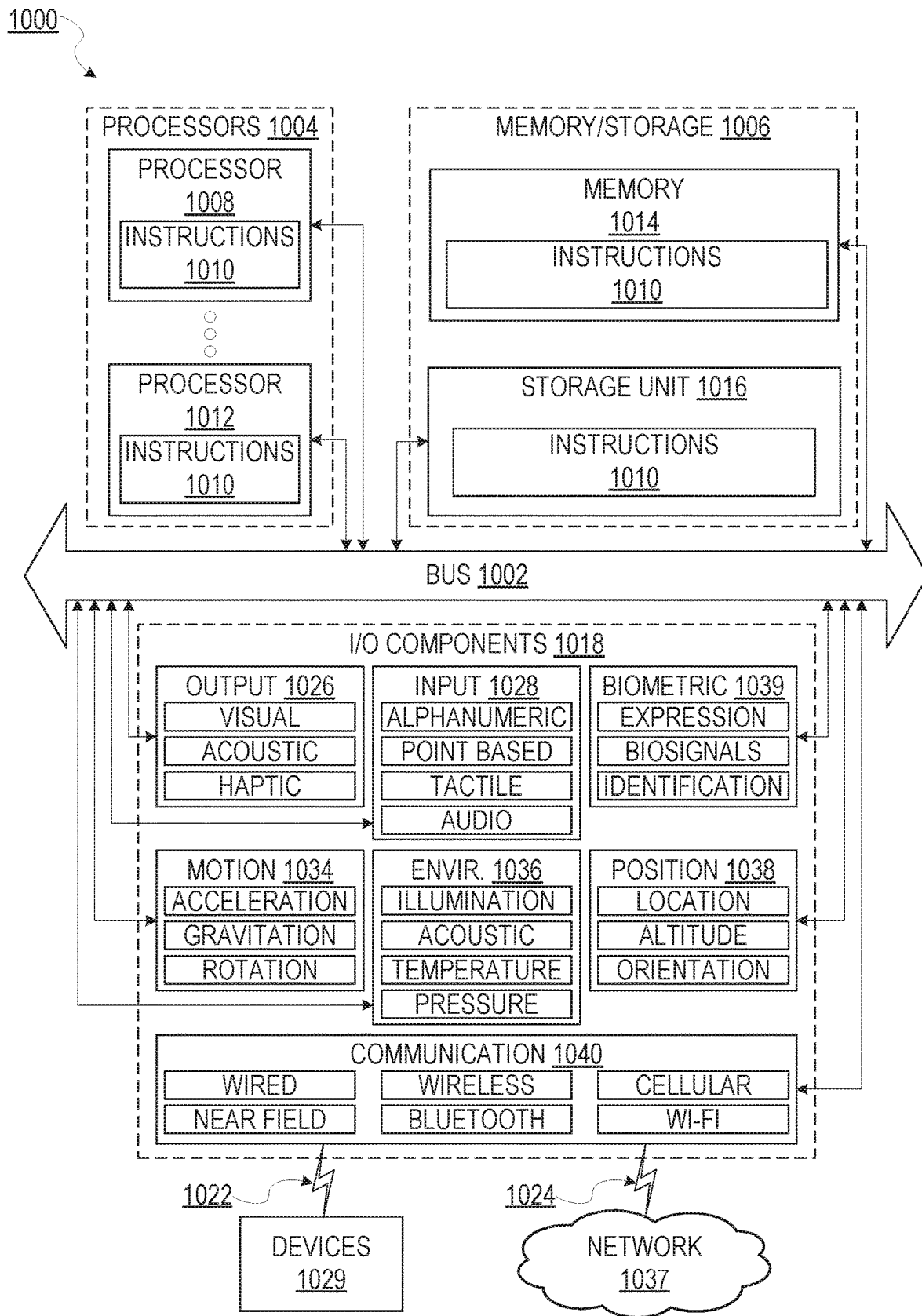
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via coupling 1024 and coupling 1022, respectively. For example, the communication components 1040 may include a network interface component or other suitable device to interface with the network 1037. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1029 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC, or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:

retrieving, using one or more processors, a plurality of content items each associated with a respective content item identifier;

generating a display comprising first and second regions associated respectively with different first and second categories of content, the first category of content being associated with a first presentation arrangement of a graphical user interface and the second category of content being associated with a second presentation arrangement of the graphical user interface, each content item of the plurality of content items being represented in the display by the respective content item identifier that is selectable to view or access the respective content item;

determining that a first content item is associated with a serial collection of content items, the first content item being associated with first and second preview video clips;

determining that the user has viewed a particular content item in the serial collection of content items;

selecting the first preview video clip to present to the user in response to determining that the user has viewed the particular content item in the serial collection of content items, the second preview video clip being selected in response to a determination that the user has not viewed any content items in the serial collection of content items;

automatically presenting the selected first preview video clip corresponding to the first content item in a content tile in response to determining that the content tile corresponding to the first content item has been brought into focus on a specified scroll position; and terminating playback of the video clip in response to determining that the content tile has been moved away from the specified scroll position.

2. The method of claim 1, further comprising:
identifying the first content item from the plurality of content items to which a user has previously reacted; and
determining a category of the first content item.

3. The method of claim 1, wherein the first region is dedicated to representing content items corresponding to the first category of content based on previous reactions of the user.

4. The method of claim 1, wherein the first region presents a given content item identifier associated with a second content item to the user, who reacted to the first content item, in the first presentation arrangement, the content items of the first region displayed in the first presentation arrangement being displayed together with content items corresponding to the second category of content of the second region displayed in the second presentation arrangement.

5. The method of claim 1, wherein the preview video clip is presented concurrently with generating a haptic feedback response.

6. The method of claim 1, wherein the plurality of content item identifiers represent a viewing status of the respective content items, further comprising:
determining that a third content item has not been viewed by the user;
in response to determining that the third content item has not been viewed by the user, providing a second content item identifier that comprises an image of a frame corresponding to the third content item together with a total duration and number of segments of the third content item; and
in response to determining that a third content item identifier corresponds to a preview video clip that is automatically playing in the third content item identifier, adding a total duration and an animated equalizer of the preview clip.

7. The method of claim 1, further comprising:
determining that a third content item has been partially viewed by the user;
in response to determining that the third content item has been partially viewed by the user, providing a second content item identifier that comprises an image of a frame corresponding to the third content item together with a remaining time left and a transport bar that is partially filled in for the third content item;
determining that a fourth content item has been completely viewed by the user; and
in response to determining that the fourth content item has been completely viewed by the user, providing a third content item identifier that comprises an image of a frame corresponding to the fourth content item together with a transport bar that is completely filled in for the fourth content item.

8. The method of claim 1, wherein the first region is presented in response to determining that a number of content items associated with the first category of content corresponds to a minimum quantity threshold.

9. The method of claim 1, further comprising removing a content identifier associated with the second content item after the user views content associated with the second content item to completion.

10. The method of claim 1, further comprising:
identifying a subset of content items that have previously been viewed by the user the first time;
computing a weight for each of the subset of content items based on an indication of whether the user captured a screenshot while viewing the respective content items in the subset of content items the first time; and
selecting a first content item for presenting the indication based on the computed weight of the first content item relative to weights of other content items in the subset of content items.

11. The method of claim 1, further comprising:
generating a first subset of the plurality of content items that includes videos the user has previously viewed;
ranking the videos in the subset of the plurality of content items based on user profile information;
selecting a second subset of the ranked plurality of content items having an associated rank that exceeds a threshold; and
presenting videos of the selected second subset of the ranked plurality of content items in a list of videos for the user to view again.

12. The method of claim 11, wherein the user profile information includes, for each of the first subset of the plurality of content items, data indicating whether the user captured a screenshot of the content item, whether the user shared the content item, or whether the user commented about the content item.

13. The method of claim 11, further comprising:
determining that the user has viewed again to completion a third content item in the selected second subset of the ranked plurality of content items presented for the user to view again; and
removing the third content item from the selected second subset of the ranked plurality of content items presented for the user to view again.

14. The method of claim 1, wherein a user profile information includes, for each of the plurality of content items, data indicating whether a user captured a screenshot of the content item.

15. The method of claim 1, wherein the first presentation arrangement presents content items in a vertical list of tiles, and wherein the second presentation arrangement presents content items in a horizontal list of tiles, further comprising:
in response to determining that a first content item is associated with the first category of content, displaying a first representation of the first content item in the vertical list of tiles of the first presentation arrangement; and
in response to determining that the first content item is associated with the second category of content, displaying the first representation of the first content item in the horizontal list of tiles of the second presentation arrangement.

16. The method of claim 1, further comprising:
receiving a user selection of the first content item in the presentation arrangement;
launching a video player for playing in full screen content associated with the first second content item in response to receiving the user selection;

presenting a transport bar in the video player, the transport bar including representations of friends of the user that viewed the first content item;

receiving input that touches the screen while the content is being played back in full screen, the input comprising a gesture that swipes down;

in response to receiving the input, gradually shrinking the content being played back from the full screen to a window having a size;

determining that the size of the window in which the content is being played back has reached a specified threshold; and in response to determining that the size of the window in which the content is being played back has reached the specified threshold, maintaining the size of the window for playing back the content.

17. The method of claim 1, further comprising:
identifying avatars associated with friends of the user who have reacted to the first content item;
determining that a number of the avatars exceeds a threshold; and
selecting a subset of the identified avatars to include in the first region based on a determination that the user accesses content generated by the subset of friends associated with the avatars more often than other friends not included in the subset of friends.

18. The method of claim 1, further comprising:
determining that a particular content item represented by a first content item identifier has previously been viewed by a user for a first time; and
in response to determining that the particular content item has previously been viewed by the user for the first time, adding the first content item identifier to the second region comprising an indication to view the particular content item again for a second time.

19. A system comprising:
one or more processors configured to execute instructions stored in memory for performing operations comprising:
retrieving a plurality of content items each associated with a respective content item identifier;
generating a display comprising first and second regions associated respectively with different first and second categories of content, the first category of content being associated with a first presentation arrangement of a graphical user interface and the second category of content being associated with a second presentation arrangement of the graphical user interface, each content item of the plurality of content items being represented in the display by the respective content item identifier that is selectable to view or access the respective content item;
determining that a first content item is associated with a serial collection of content items, the first content item being associated with first and second preview video clips;
determining that the user has viewed a particular content item in the serial collection of content items;
selecting the first preview video clip to present to the user in response to determining that the user has viewed the particular content item in the serial collection of content items, the second preview video clip being selected in response to a determination that the user has not viewed any content items in the serial collection of content items;
automatically presenting the selected first preview video clip corresponding to the first content item in a content tile in response to determining that the content tile corresponding to the first content item has been brought into focus on a specified scroll position; and
terminating playback of the video clip in response to determining that the content tile has been moved away from the specified scroll position.

20. A non-transitory computer-readable medium comprising non-transitory computer-readable instructions that, when executed by one or more processors, perform operations comprising:
retrieving a plurality of content items each associated with a respective content item identifier;
generating a display comprising first and second regions associated respectively with different first and second categories of content, the first category of content being associated with a first presentation arrangement of a graphical user interface and the second category of content being associated with a second presentation arrangement of the graphical user interface, each content item of the plurality of content items being represented in the display by the respective content item identifier that is selectable to view or access the respective content item;
determining that a first content item is associated with a serial collection of content items, the first content item being associated with first and second preview video clips;
determining that the user has viewed a particular content item in the serial collection of content items;
selecting the first preview video clip to present to the user in response to determining that the user has viewed the particular content item in the serial collection of content items, the second preview video clip being selected in response to a determination that the user has not viewed any content items in the serial collection of content items;
automatically presenting the selected first preview video clip corresponding to the first content item in a content tile in response to determining that the content tile corresponding to the first content item has been brought into focus on a specified scroll position; and
terminating playback of the video clip in response to determining that the content tile has been moved away from the specified scroll position.

* * * * *